United States Patent
Gotani

(10) Patent No.: US 8,922,064 B2
(45) Date of Patent: Dec. 30, 2014

(54) WIRELESS POWER FEEDER, WIRELESS POWER RECEIVER, AND WIRELESS POWER TRANSMISSION SYSTEM, AND COIL

(75) Inventor: Akira Gotani, Tokyo (JP)

(73) Assignee: TDK Corporation, Tokyo (JP)

( * ) Notice: Subject to any disclaimer, the term of this patent is extended or adjusted under 35 U.S.C. 154(b) by 661 days.

(21) Appl. No.: 13/209,868

(22) Filed: Aug. 15, 2011

(65) Prior Publication Data

US 2012/0223586 A1 Sep. 6, 2012

Related U.S. Application Data

(60) Provisional application No. 61/447,849, filed on Mar. 1, 2010.

(51) Int. Cl.
*H01F 27/42* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| | | | |
|---|---|---|---|
| 2,910,661 A | 10/1959 | Glynn | |
| 5,898,579 A | 4/1999 | Boys et al. | |
| 7,741,734 B2 | 6/2010 | Joannopoulos et al. | |
| 8,569,914 B2 * | 10/2013 | Karalis et al. | 307/104 |
| 2007/0222542 A1 | 9/2007 | Joannopoulos et al. | |
| 2008/0278264 A1 | 11/2008 | Karalis et al. | |
| 2009/0072629 A1 | 3/2009 | Cook et al. | |
| 2009/0079268 A1 | 3/2009 | Cook et al. | |
| 2009/0224608 A1 | 9/2009 | Cook et al. | |
| 2010/0052431 A1 | 3/2010 | Mita | |
| 2010/0164298 A1 | 7/2010 | Karalis et al. | |
| 2011/0006612 A1 | 1/2011 | Kozakai | |
| 2011/0140429 A1 | 6/2011 | Bohori et al. | |

FOREIGN PATENT DOCUMENTS

| | | |
|---|---|---|
| JP | 4-368107 A | 12/1992 |
| JP | 5-090922 U | 12/1993 |
| JP | 2000-182864 A | 6/2000 |
| JP | 2001-044054 A | 2/2001 |
| JP | 2006-230032 | 8/2006 |
| JP | 2007-088011 A | 4/2007 |
| JP | 2008-235690 A | 10/2008 |
| JP | 2010-063245 | 3/2010 |
| JP | 2010-130878 | 6/2010 |

(Continued)

OTHER PUBLICATIONS

Non-Final Office Action U.S. Appl. No. 13/405,878 dated Aug. 28, 2014.

*Primary Examiner* — Robert L. Deberadinis
(74) *Attorney, Agent, or Firm* — McDermott Will & Emery LLP

(57) ABSTRACT

A wireless power feeder feeds power from a feeding coil to a receiving coil by wireless using a magnetic field resonance phenomenon. The feeding coil is constructed in a rotatable manner. A power transmission control circuit that supplies AC power to the feeding coil so as to make the feeding coil feed the AC power to the receiving coil. The feeding coil is constructed such that the magnetic characteristics thereof in the circumferential direction are made non-uniform. Concretely, a magnetic body is installed at only a part of the circumference of the feeding coil to make the magnetic characteristics of the feeding coil in the circumferential direction non-uniform.

10 Claims, 40 Drawing Sheets

(56) References Cited

FOREIGN PATENT DOCUMENTS

| | | |
|---|---|---|
| JP | 2010-141976 | 6/2010 |
| JP | 2010-141977 | 6/2010 |
| JP | 2010-158151 | 7/2010 |
| JP | 2010-239777 | 10/2010 |
| JP | 2010-239848 | 10/2010 |
| JP | 2011-019291 | 1/2011 |
| WO | WO 2006/022365 A1 | 3/2006 |

* cited by examiner

| INTER-COIL DISTANCE [mm] | ROTATION ANGLE [deg] | EFFICIENCY [%] |
| --- | --- | --- |
| 0 | 180 | 3.3 |
| 5 | 180 | 6.1 |
| 10 | 160 | 14.7 |
| 15 | 160 | 53.0 |
| 20 | 100 | 62.6 |
| 25 | 75 | 62.0 |
| 30 | 55 | 61.9 |
| 35 | 25 | 61.4 |
| 40 | 0 | 62.1 |
| 45 | −30 | 58.6 |
| 50 | −30 | 17.8 |
| 55 | −30 | 6.1 |
| 60 | −30 | 2.5 |

FIG.6

| INTER-COIL DISTANCE [mm] | ROTATION ANGLE [deg] | EFFICIENCY [%] |
|---|---|---|
| 0 | 180 | 4.0 |
| 4 | 180 | 9.5 |
| 8 | 160 | 25.6 |
| 10 | 150 | 45.7 |
| 12 | 150 | 60.6 |
| 14 | 110 | 60.1 |
| 16 | 80 | 59.7 |
| 18 | 60 | 60.0 |
| 20 | 0 | 59.4 |
| 22 | 0 | 16.5 |
| 24 | 0 | 10.7 |
| 28 | 0 | 4.8 |
| 32 | 0 | 2.7 |
| 40 | 0 | 1.2 |

FIG.10

WIRELESS POWER FEEDER, WIRELESS POWER RECEIVER, AND WIRELESS POWER TRANSMISSION SYSTEM, AND COIL

RELATED APPLICATIONS

This application claims the benefit of United States Provisional Application No.61/447,849, filed on Mar. 1, 2010, the disclosure of which Application is incorporated by reference herein.

BACKGROUND OF THE INVENTION

1. Field of the Invention

The present invention relates to wireless power feeding and, more particularly, to a power control thereof.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range. The type (B) utilizing radio wave is available in a long range; however, it has small electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, high current flows in the receiving coil. At this time, current also flows in the loading coil according to the principle of electromagnetic induction, and power is taken from a load connected in series to the loading coil. By utilizing the magnetic field resonance phenomenon, high power transmission efficiency can be achieved even if the feeding coil and receiving coil are largely spaced from each other (refer to Patent Document 2, Patent Document 3 and Patent Document 4).

CITATION LIST

Patent Document

[Patent Document 1] U.S. Pat. Appln. Publication No. 2008/0278264
[Patent Document 2] Jpn. Pat. Appln. Laid-Open Publication No. 2006-230032
[Patent Document 3] International Publication Pamphlet No. WO2006/022365
[Patent Document 4] U.S. Pat. Appln. Publication No. 2009/0072629
[Patent Document 5] Jpn. Pat. Appln. Laid-Open Publication No. 2010-141977
[Patent Document 6] Jpn. Pat. Appln. Laid-Open Publication No. 2010-130878
[Patent Document 7] Jpn. Pat. Appln. Laid-Open Publication No. 2010-239777
[Patent Document 8] Jpn. Pat. Appln. Laid-Open Publication No. 2010-63245
[Patent Document 9] Jpn. Pat. Appln. Laid-Open Publication No. 2011-19291

The present inventor considers that a mechanism for controlling the magnitude of feeding power or power feeding direction is required in order to extend the applicability of wireless power feeding. In a technique disclosed in Patent Document 5, an input impedance on the power receiving side is adjusted by a variable capacitor to adjust the magnitude of receiving power. Also in the techniques disclosed in Patent Document 6, Patent Document 7, and Patent Document 8, a variable capacitor or a variable inductor is used to control power feeding or power receiving; however, in this case, the system configuration is inevitably complicated.

SUMMARY

A main object of the present invention is to control the magnitude of feeding power or power feeding direction with a simpler configuration in wireless power feeding of a magnetic field resonance type.

A wireless power feeder according to the present invention is a device for feeding power from a feeding coil to a receiving coil by wireless using a magnetic field resonance phenomenon between the feeding coil and receiving coil. The wireless power feeder includes the rotatable feeding coil and a power transmission control circuit that supplies AC power to the feeding coil so as to make the feeding coil feed the AC power to the receiving coil. The feeding coil is constructed such that the magnetic characteristics thereof in the circumferential direction are made non-uniform.

The "non-uniformity of the magnetic characteristics" mentioned here is to locally increase or reduce a magnetic field at a coil plane so as not to make the magnetic flux density in the coil plane uniform. By partially changing the coil shape or coil material, the non-uniformity of the magnetic characteristics can be achieved. When a feeding coil of such a non-uniform type is rotated, mutual inductance between the feeding coil and receiving coil changes, with the result that the magnitude of feeding power or power feeding direction changes. The "rotatable" mentioned here does not mean that the feeding coil itself needs to be rotated. For example, only some components of the coil may be rotated. In any case, it is only necessary to be able to change the distribution state of the magnetic field by using the feeding coil whose magnetic characteristics in the circumferential direction are non-uniform.

A magnetic body may be installed at only a part of the circumference of the feeding coil so as to make the magnetic characteristics of the feeding coil in the circumferential direction non-uniform. In this case, the feeding coil and magnetic body may be rotated together in an integrated manner, or only the magnetic body may be rotated. Further, by changing the installation position of the magnetic body with respect to the feeding coil or receiving coil, the magnetic characteristics can be changed. For example, when the magnetic body installed at a part of the feeding coil is once removed and then installed at another position, the magnetic characteristics of the feeding coil can be changed.

The power transmission control circuit may rotate the feeding coil so as to control the AC power to be fed from the feeding coil to the receiving coil.

A wireless power receiver according to the present invention is a device for receiving, at a receiving coil, AC power fed from a feeding coil by wireless using a magnetic field resonance phenomenon between the feeding coil and receiving coil. The wireless power receiver includes the rotatable receiving coil and a loading circuit including a loading coil that is magnetically coupled to the receiving coil to receive the AC power from the receiving coil and a load that receives the AC power from the loading coil. The receiving coil is constructed such that the magnetic characteristics thereof in the circumferential direction thereof are made non-uniform.

A magnetic body may be installed at only a part of the circumference of the receiving coil so as to make the magnetic characteristics of the receiving coil in the circumferential direction non-uniform.

The wireless power receiver may further include a power receiving control circuit that rotates the receiving coil so as to control the AC power received by the receiving coil.

A wireless power transmission system according to the present invention is a system for feeding power by wireless from a feeding coil to a receiving coil using a magnetic field resonance phenomenon between the feeding coil and receiving coil. This system includes a wireless power feeder and a wireless power receiver. The wireless power feeder includes the feeding coil and a power transmission control circuit that supplies AC power to the feeding coil so as to make the feeding coil feed the AC power to the receiving coil. The wireless power receiver includes the receiving coil and a loading circuit including a loading coil that is magnetically coupled to the receiving coil to receive the AC power from the receiving coil and a load that receives the AC power from the loading coil. Both or one of the feeding and receiving coils are constructed in a rotatable manner and constructed as a non-uniform type coil in which the magnetic characteristics thereof in the circumferential direction are non-uniform.

The receiving coil may be constructed as the non-uniform type coil, and the wireless power receiver may rotate the receiving coil so as to control the AC power received by the receiving coil.

The feeding coil may be constructed as the non-uniform type coil, and the power transmission control circuit may rotate the feeding coil so as to control the AC power to be fed from the feeding coil to the receiving coil.

A plurality of the wireless power receivers may be provided for one wireless power feeder. In this case, AC power supplied from one feeding coil may be received by one or more receiving coils.

A coil according to the present invention is constructed such that the magnetic characteristics thereof in the circumferential direction are made non-uniform. A magnetic body may be installed at only a part of the circumference of the coil to make the magnetic characteristics of the coil in the circumferential direction non-uniform. For example, a circular arc magnetic body may be installed along the inner side or outer side of the coil circumference to make the magnetic characteristics of the coil in the circumferential direction non-uniform.

According to the present invention, control of the magnitude of feeding power or power feeding direction can be facilitated with a simple configuration in wireless power feeding of a magnetic field resonance type.

BRIEF DESCRIPTION OF THE DRAWINGS

The above features and advantages of the present invention will be more apparent from the following description of certain preferred embodiments taken in conjunction with the accompanying drawings, in which:

FIG. 6 is a table corresponding to a with magnetic body/ with-rotation characteristic of FIG. 5;

FIG. 10 is a table corresponding to the with magnetic body/with rotation characteristic of FIG. 9;

DETAILED DESCRIPTION OF THE EMBODIMENTS

A preferred embodiment of the present invention will be described below with reference to the accompanying drawings.

Figure 1:
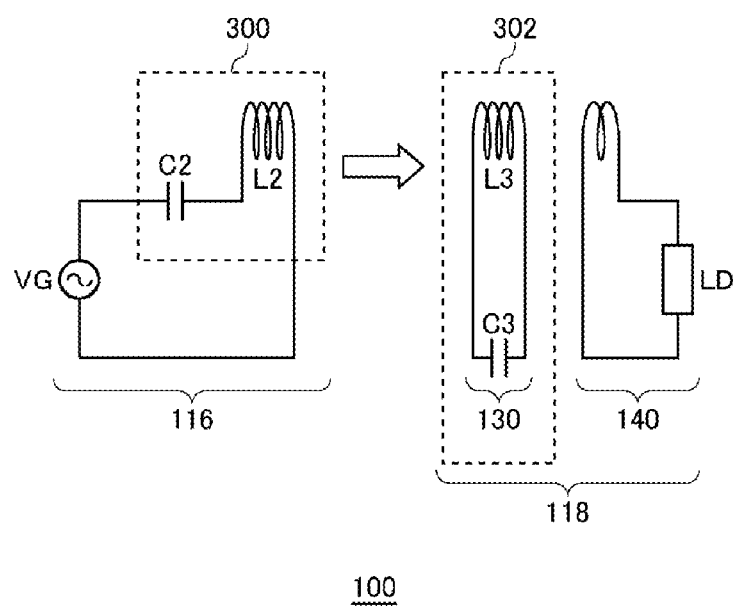
FIG. 1 is a view illustrating operation principle of a wireless power transmission system according to first, second, and third embodiments.

FIG. 1 is a view illustrating operation principle of a wireless power transmission system 100 according to first, second, and third embodiments. The wireless power transmission systems 100 according to the first, second, and third embodiments each include a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting a part of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Although FIG. 1 illustrates a configuration in which the wireless power feeder 116 does not include an exciting coil, the basic operation principle is the same as in the case where the wireless power feeder 116 includes the exciting coil.

Figure 2:
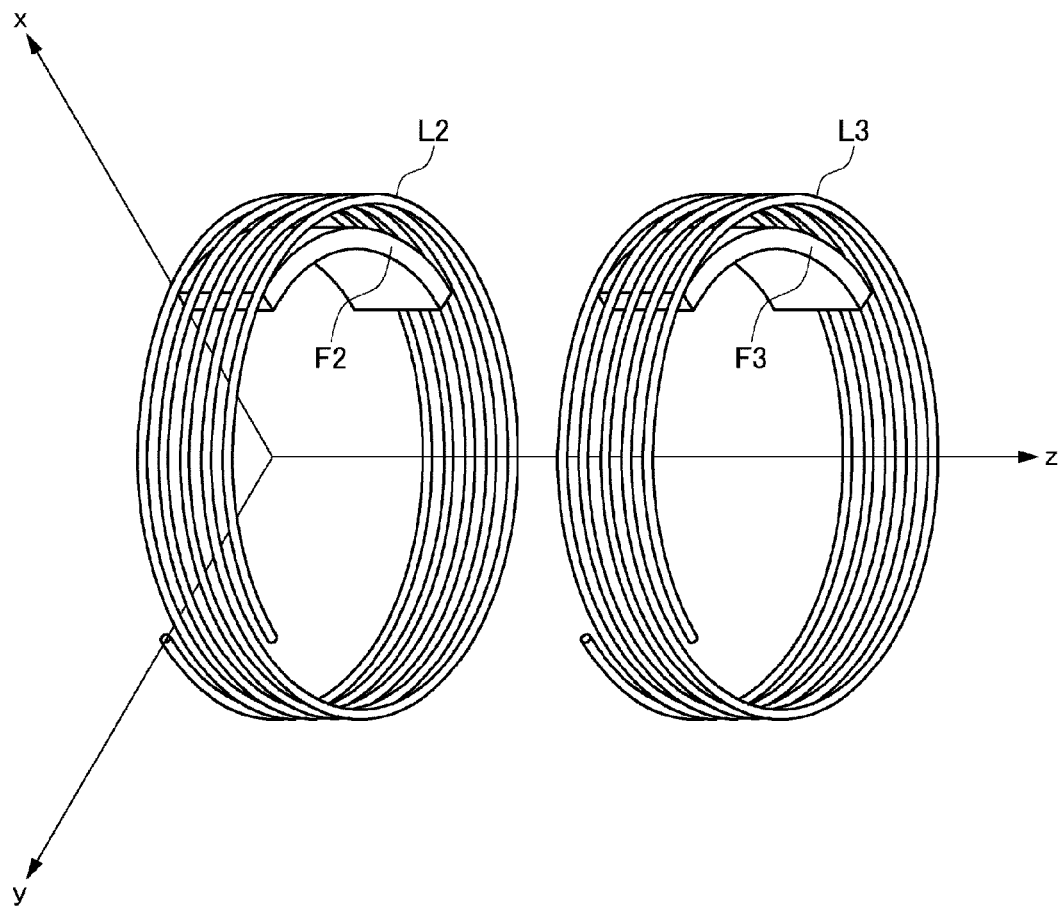
FIG. 2 is a perspective view of a feeding coil L2 and a receiving coil L3 each having a magnetic body.

FIG. 2 is a perspective view of the feeding coil L2 and receiving coil L3 each having a magnetic body. In FIG. 2 and subsequent drawings, z-axis is set in the right direction, that is, power feeding direction. Either the feeding coil L2 or receiving coil L3 in the present embodiment is a circular coil. A power feeding side magnetic body F2 is installed inside the feeding coil L2. A power receiving side magnetic body F3 is installed inside the receiving coil L3. Although the power feeding side magnetic body F2 and power receiving side magnetic body F3 are each made of ferrite in the present embodiment, they may each be made of another magnetic material.

Either the power feeding side magnetic body F2 or power receiving side magnetic body F3 has a circular arc shape. The power feeding side magnetic body F2 covers only a part of the inner side surface of the feeding coil L2, and the power receiving side magnetic body F3 covers only a part of the inner side surface of the receiving coil L3. As a result, the magnetic characteristics of the feeding coil L2 and receiving coil L3 become non-uniform on xy plane, that is, in the circumferential direction. More specifically, the magnetic field of the feeding coil L2 becomes locally strong near the power feeding side magnetic body F2 and, similarly, the magnetic field of the receiving coil L3 becomes locally strong near the power receiving side magnetic body F3. Although described later in detail, when the power feeding side magnetic body F2 and power receiving side magnetic body F3 face each other as illustrated in FIG. 2, power transmission efficiency becomes maximum.

[First Embodiment]

Figure 3:
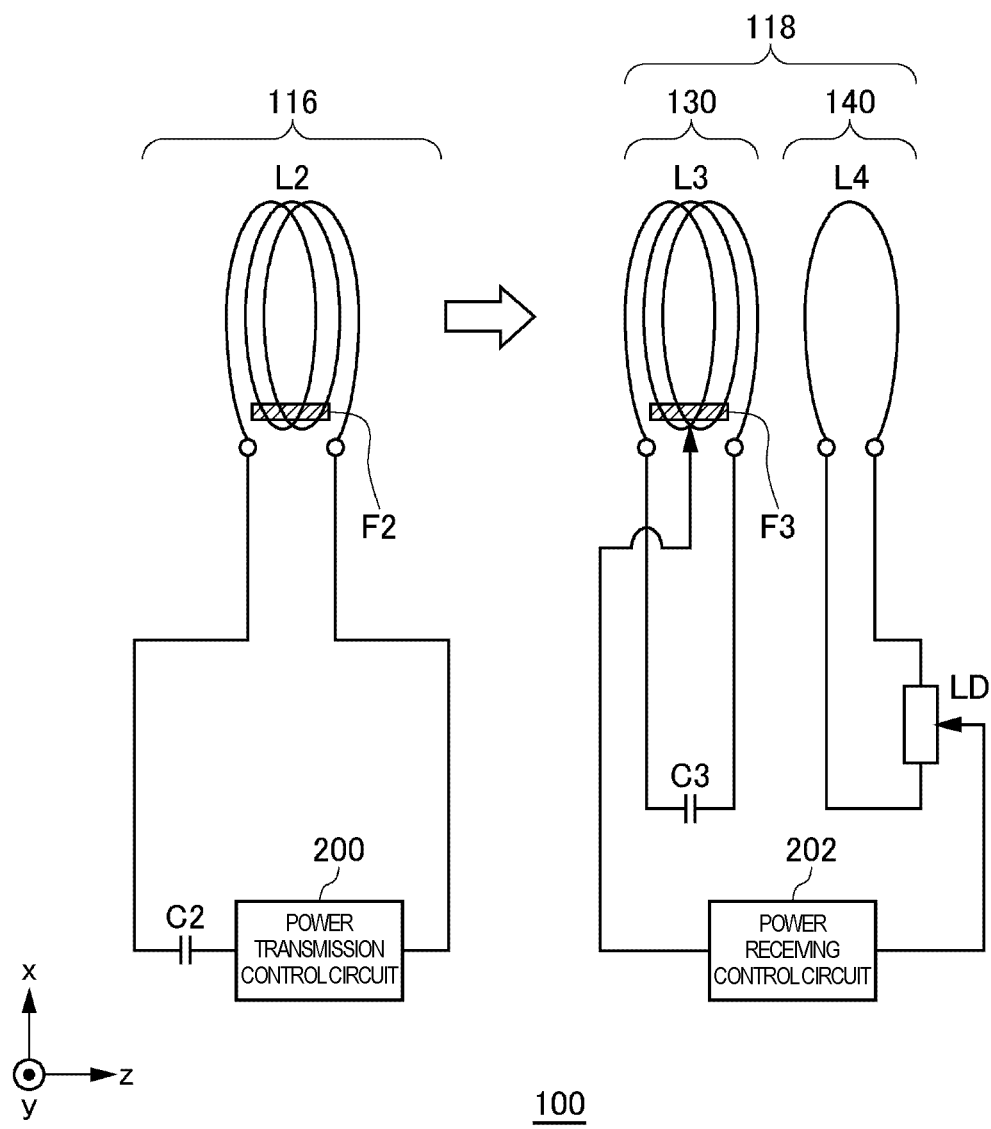
FIG. 3 is a view schematically illustrating a wireless power transmission system according to a first embodiment.

FIG. 3 is a view schematically illustrating a wireless power transmission system according to a first embodiment. A power transmission control circuit 200 functions as an AC power supply and supplies AC power of a drive frequency fo to the feeding coil L2. The power transmission control circuit 200 in the first embodiment functions merely as a power feeding source VG (FIG. 1). The drive frequency fo may be a fixed frequency. For example, the drive frequency fo may be set to the resonance frequency fr1. As a matter of course, the power transmission control circuit 200 may be configured to be able to change the drive frequency fo.

The wireless power receiver 118 includes a receiving coil circuit 130 and a loading circuit 140. In the receiving coil circuit 130, a power receiving LC resonance circuit 302 (refer to FIG. 1) is formed by a receiving coil L3 and capacitor C3. When the feeding coil L2 generates an AC magnetic field at the resonance frequency fr1, the feeding coil L2 and receiving coil L3 are magnetic-field coupled to each other, causing AC current to flow in the receiving coil circuit 130. Both the wireless power feeder 116 and receiving coil circuit 130 are made to resonate by the AC magnetic field generated by the feeding coil L2.

The loading circuit 140 is a circuit in which a loading coil L4 and a load LD are connected in series. The receiving coil L3 and loading coil L4 face each other. The distance between the receiving coil L3 and loading coil L4 is nearly zero. Thus, the receiving coil L3 and loading coil L4 are electromagnetically strongly coupled (coupling based on electromagnetic induction) to each other. When the AC current is made to flow in the receiving coil L3, an electromotive force occurs in the loading circuit 140 to cause AC current to flow in the loading circuit 140.

The AC power fed from the feeding coil L2 of the wireless power feeder 116 is received by the receiving coil L3 of the wireless power receiver 118 and taken from the load LD.

The power transmission control circuit 200 in the first embodiment is a mere AC power supply, so that the power transmission control circuit 200 can be formed by the application of known techniques.

The receiving coil L3 in the first embodiment is constructed in a rotatable manner. A power receiving control circuit 202 measures the receiving power of the load LD and rotates the receiving coil L3 according to the measurement result. For example, a target value of receiving power is previously set in the power receiving control circuit 202. The power receiving control circuit 202 measures the power (receiving power) to be supplied to the load LD while rotating the receiving coil L3. When the receiving coil L3 is rotated, the distance between the power feeding side magnetic body F2 and power receiving side magnetic body F3 changes. The rotation of the receiving coil L3 changes the mutual inductance between the feeding coil L2 and receiving coil L3, so that the power transmission efficiency also changes. The power receiving control circuit 202 stops the rotation of the receiving coil L3 when the receiving power coincides with the target value. According to such a control method, receiving power can be adjusted in the wireless power receiver 118 with a simple configuration by rotating the receiving coil L3.

The power receiving control circuit 202 can detect the receiving power of the load LD using a known power measurement system. Alternatively, as disclosed in Japanese Patent Application 2010-182830, a voltage value to be applied to the load LD can be set as a control target.

The feeding coil L2 may be rotated in place of the receiving coil L3, and both the feeding coil L2 and receiving coil L3 may be rotated. When the feeding coil L2 is rotated, the setting of the power receiving control circuit 202 is changed so as to rotate the feeding coil L2 in place of the receiving coil L3. The feeding coil L2 and receiving coil L3 need not have the same size or shape. Further, the feeding coil L2 and receiving coil L3 need not always face each other, but may be arranged in parallel to each other.

Figure 4:
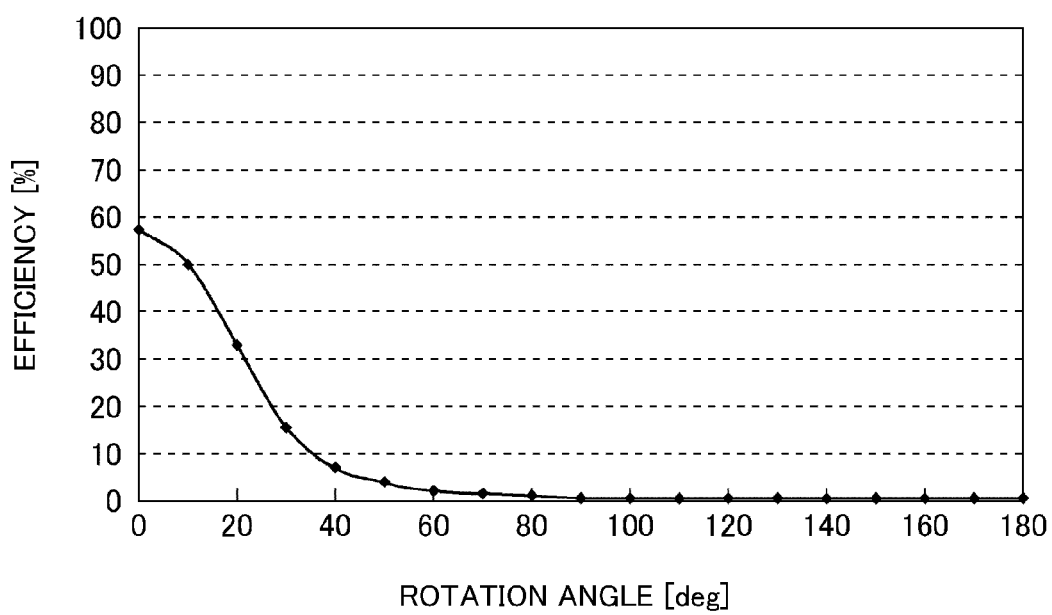
FIG. 4 is a graph illustrating the relationship between the rotation angle of the feeding coil and power transmission efficiency.

FIG. 4 is a graph illustrating the relationship between the rotation angle of the feeding coil L2 and power transmission efficiency. The rotation angle at which the power feeding side magnetic body F2 and power receiving side magnetic body F3 face each other is defined to be 0°. Although the graph of FIG. 4 illustrates the power transmission efficiency in the case where the feeding coil L2 is rotated, the same result is obtained in the case where the receiving coil L3 is rotated. The power transmission efficiency at a rotation angle of 0° is about 59%. The further the power feeding side magnetic body F2 and power receiving side magnetic body F3 deviate from each other by the rotation of the feeding coil L2, the lower the power transmission efficiency becomes.

Figure 5:
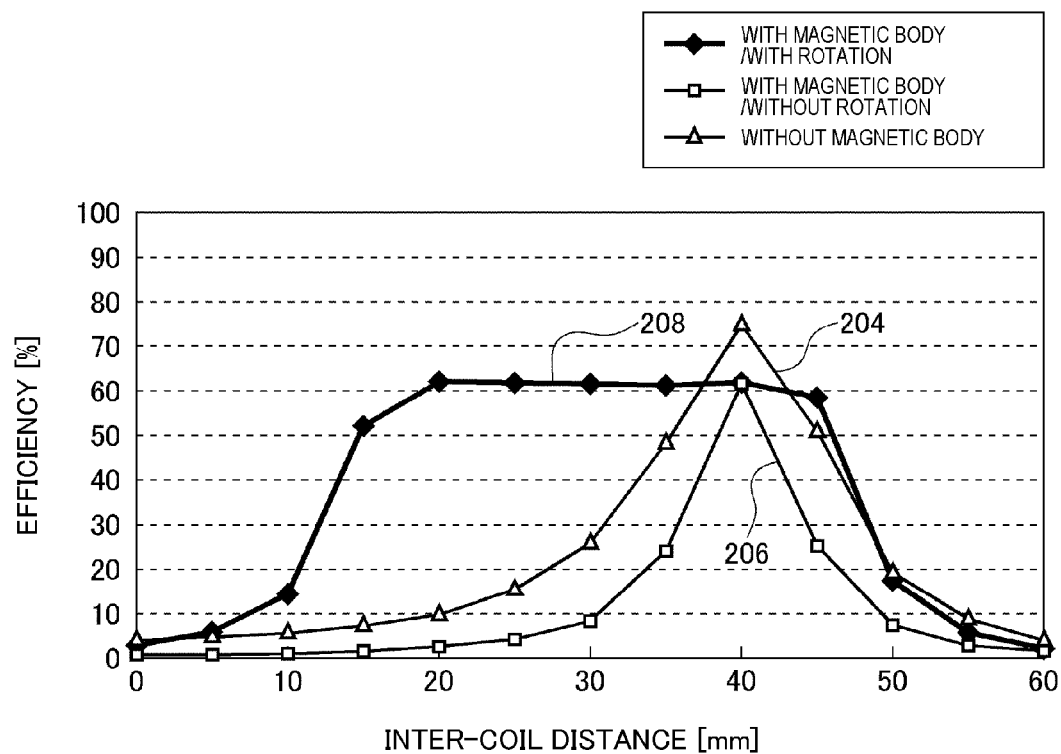
FIG. 5 is a graph illustrating the relationship between an inter-coil distance and power transmission efficiency in the case where feeding coil L2 having the power feeding side magnetic body F2 and receiving coil L3 having the power receiving side magnetic body F3 are moved in the horizontal direction.

FIG. 5 is a graph illustrating the relationship between an inter-coil distance and power transmission efficiency in the case where feeding coil L2 having the power feeding side magnetic body F2 and receiving coil L3 having the power receiving side magnetic body F3 are moved in the horizontal direction. The horizontal axis represents the inter-coil distance between the feeding coil L2 and receiving coil L3 which are moved in the horizontal direction (e.g., x-direction). In this example, the inter-coil distance (distance between the feeding coil L2 and receiving coil L3) when the feeding coil L2 and receiving coil L3 face each other, is defined to be 0 mm and, for example, the inter-coil distance when the receiving coil L3 is moved with respect to the feeding coil L2 along the x-axis by 40 mm is defined to be 40 mm. Further, in this example, the drive frequency fo is set such that the power transmission efficiency becomes maximum when the inter-coil distance between a feeding coil L2 (hereinafter, referred also to "conventional feeding coil L2") that does not have the power feeding side magnetic body F2 and a receiving coil L3 (hereinafter, referred to also as "conventional receiving coil L3") that does not have the power receiving side magnetic body F3 is 40 mm. Thus, in a without magnetic body characteristic 204 representing power transmission efficiency characteristics with respect to the inter-coil distance between the conventional feeding coil L2 and conventional receiving coil L3, the power transmission efficiency becomes maximum when the inter-coil distance is 40 mm. When the inter-coil distance is shifted from 40 mm, the power transmission efficiency rapidly decreases.

A with magnetic body/without rotation characteristic 206 represents power transmission efficiency characteristics in the case where the power feeding side magnetic body F2 and power receiving side magnetic body F3 are installed in the feeding coil L2 and receiving coil L3 (hereinafter, referred to also as "non-uniform type feeding coil L2" and "non-uniform type receiving coil L3") but neither the feeding coil L2 nor receiving coil L3 is rotated. Also in this case, when the inter-coil distance is shifted from 40 mm, the power transmission efficiency rapidly decreases.

FIG. 6 is a table corresponding to a with magnetic body/with rotation characteristic 208 of FIG. 5. The with magnetic body/with rotation characteristic 208 represents power transmission efficiency in the case where the receiving coil L3 (non-uniform type) is rotated when the feeding coil L2 (non-uniform type) is moved in the horizontal direction so as to stabilize receiving power. In this example, the rotation angle when the inter-coil distance is 40 mm is defined to be 0°. According to the with magnetic body/with rotation characteristic 208, a power transmission efficiency of about 60% can be maintained in the range of the inter-coil distance from 20 mm to 45 mm. This is because the decrease in the power transmission efficiency in accordance with the change in the inter-coil distance is compensated by the rotation of the receiving coil L3 (non-uniform type).

Assume that the inter-coil distance is changed from 40 mm (rotation angle: 0°) to 35 mm. If the feeding coil L2 and receiving coil L3 are not rotated (with magnetic body/without rotation characteristic 206), the power feeding side magnetic body F2 and power receiving side magnetic body F3 are brought close to each other by 5 mm, so that resonance frequency characteristics are significantly changed, with the result that the power transmission efficiency decreases. However, when the receiving coil L3 is rotated in a direction in which the power feeding side magnetic body F2 and power receiving side magnetic body F3 are away from each other when the feeding coil L2 and receiving coil L3 are brought close to each other, the distance between the power feeding side magnetic body F2 and power receiving side magnetic body F3 is not so changed, making it easy to maintain the power transmission efficiency. That is, the influence due to a change in the distance can be diminished or cancelled by the rotation. As a result, wireless power feeding having a resistance to a change in the distance can be achieved.

Figure 7:
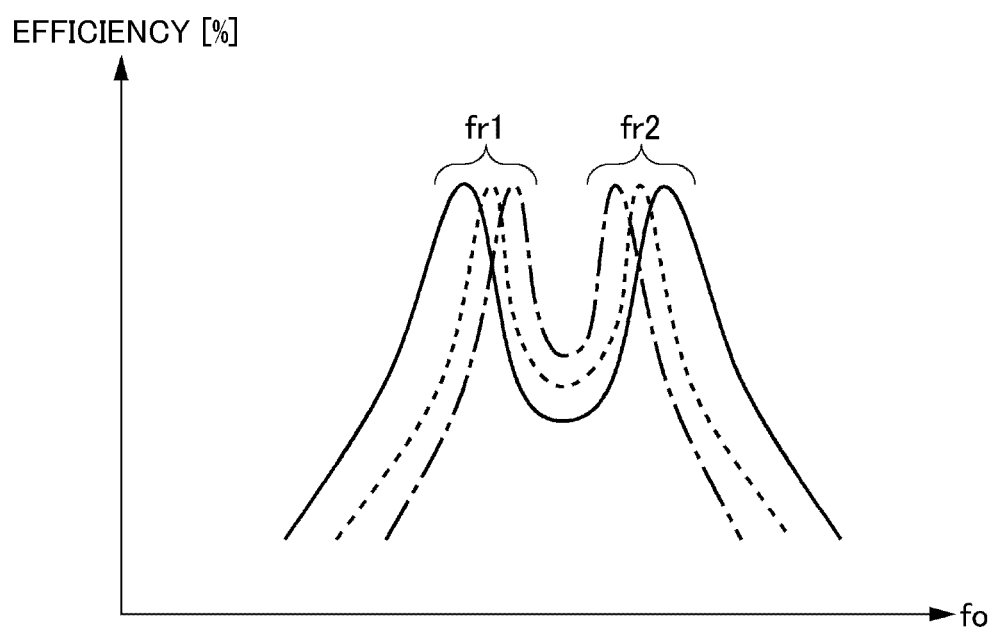
FIG. 7 is a graph illustrating the relationship between power feeding drive frequency and power transmission efficiency in a with magnetic body/with rotation configuration.

FIG. 7 is a graph illustrating the relationship between power feeding drive frequency and power transmission efficiency in the "with magnetic body/with rotation" configuration. As described using FIG. 1, the wireless power transmission system 100 exhibits the maximum power transmission efficiency at the resonance frequencies fr1 and fr2. Three curves illustrated in FIG. 7 correspond to different inter-coil distances (short distance, intermediate distance, and long distance), respectively, and each represents the relationship between the drive frequency fo and power transmission efficiency. As described using FIGS. 5 and 6, the change in the inter-coil distance can be compensated by the rotation of the receiving coil L3, the resonance frequency characteristics with respect to the inter-coil distance are made stable. As can be seen from FIG. 7, the resonance frequencies fr1 and fr2 do not change much depending on the inter-coil distance.

Figure 8:
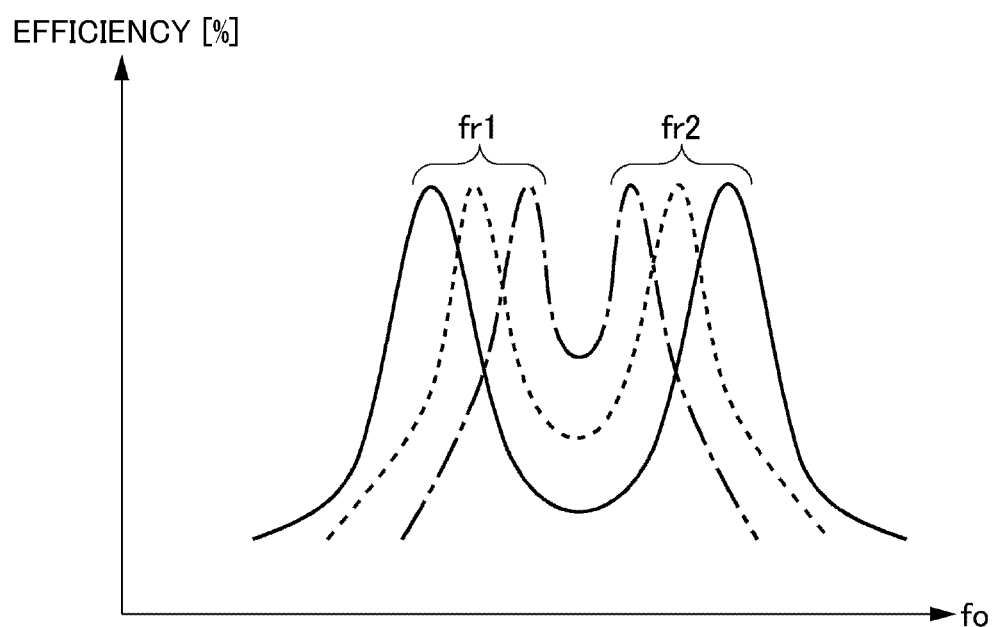
FIG. 8 is a graph illustrating the relationship between power feeding drive frequency and power transmission efficiency in the with magnetic body/without rotation configuration.

FIG. 8 is a graph illustrating the relationship between power feeding drive frequency and power transmission efficiency in the "with magnetic body/without rotation" configuration. FIG. 8 illustrates the relationship between the drive frequency fo and power transmission efficiency in the case where the receiving coil L3 is not rotated. Three curves illustrated in FIG. 8 correspond to the three inter-coil distances of FIG. 7. As can be seen from FIG. 8, the change in the inter-coil distance is not compensated by the rotation of the receiving coil L3, so that the resonance frequency characteristics significantly depend on the inter-coil distance. That is, the resonance frequencies fr1 and fr2 change much depending on the inter-coil distance.

Figure 9:
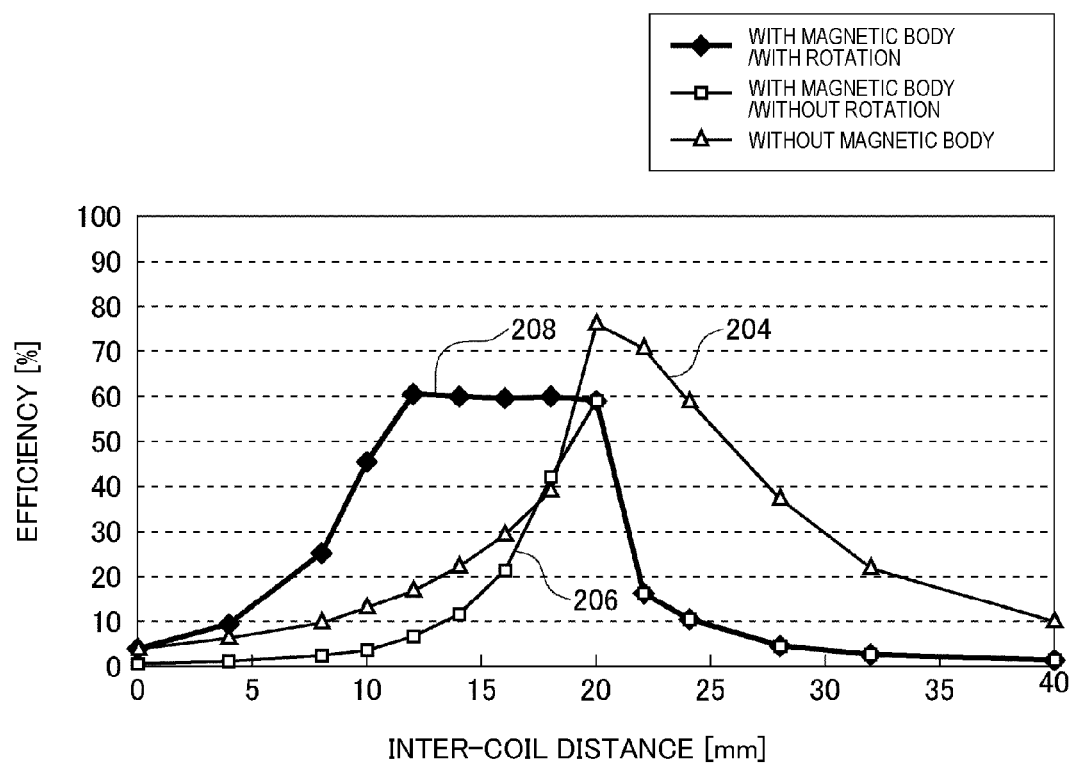
FIG. 9 is a graph illustrating the relationship between the inter-coil distance and power transmission efficiency in the case where feeding coil L2 having the power feeding side magnetic body F2 and receiving coil L3 having the power receiving side magnetic body F3 are moved in the vertical direction.

FIG. 9 is a graph illustrating the relationship between the inter-coil distance and power transmission efficiency in the case where feeding coil L2 having the power feeding side magnetic body F2 and receiving coil L3 having the power receiving side magnetic body F3 are moved in the vertical direction. The horizontal axis represents the inter-coil distance between the feeding coil L2 and receiving coil L3 which are moved in the vertical direction (z-direction). In this example, the inter-coil distance when the feeding coil L2 and receiving coil L3 facing each other, is defined to be 0 mm and, for example, the inter-coil distance when the receiving coil L3 is moved with respect to the feeding coil L2 along the z-axis by 20 mm is defined to be 20 mm. Further, in this example, the drive frequency fo is fixed such that the power transmission efficiency becomes maximum when the inter-coil distance between the conventional feeding coil L2 and conventional receiving coil L3 is 20 mm. Thus, in the without-magnetic body characteristic 204, the power transmission efficiency becomes maximum when the inter-coil distance is 20 mm; when the inter-coil distance is shifted from 20 mm, the power transmission efficiency rapidly decreases.

The "with magnetic body/without rotation" characteristic 206 represents power transmission efficiency characteristics in the case where the power feeding side magnetic body F2 and power receiving side magnetic body F3 are installed in the feeding coil L2 and receiving coil L3 but neither the feeding coil L2 nor receiving coil L3 is rotated. Also in this case, when the inter-coil distance is shifted from 20 mm, the power transmission efficiency rapidly decreases.

FIG. 10 is a table corresponding to the with magnetic body/with rotation characteristic 208 of FIG. 9. The with magnetic body/with rotation characteristic 208 represents control characteristics in the case where the non-uniform type receiving coil L3 is rotated when the non-uniform type feeding coil L2 is moved in the vertical direction so as to stabilize receiving power. In this example, the rotation angle when the inter-coil distance is 20 mm is defined to be 0°. According to the with magnetic body/with rotation characteristic 208, a power transmission efficiency of about 60% can be maintained in the range of the inter-coil distance from 12 mm to 20 mm. That is, the influence due to a change in the vertical direction (power feeding direction) distance can be diminished or cancelled by the rotation of the receiving coil L3.

Figure 11:
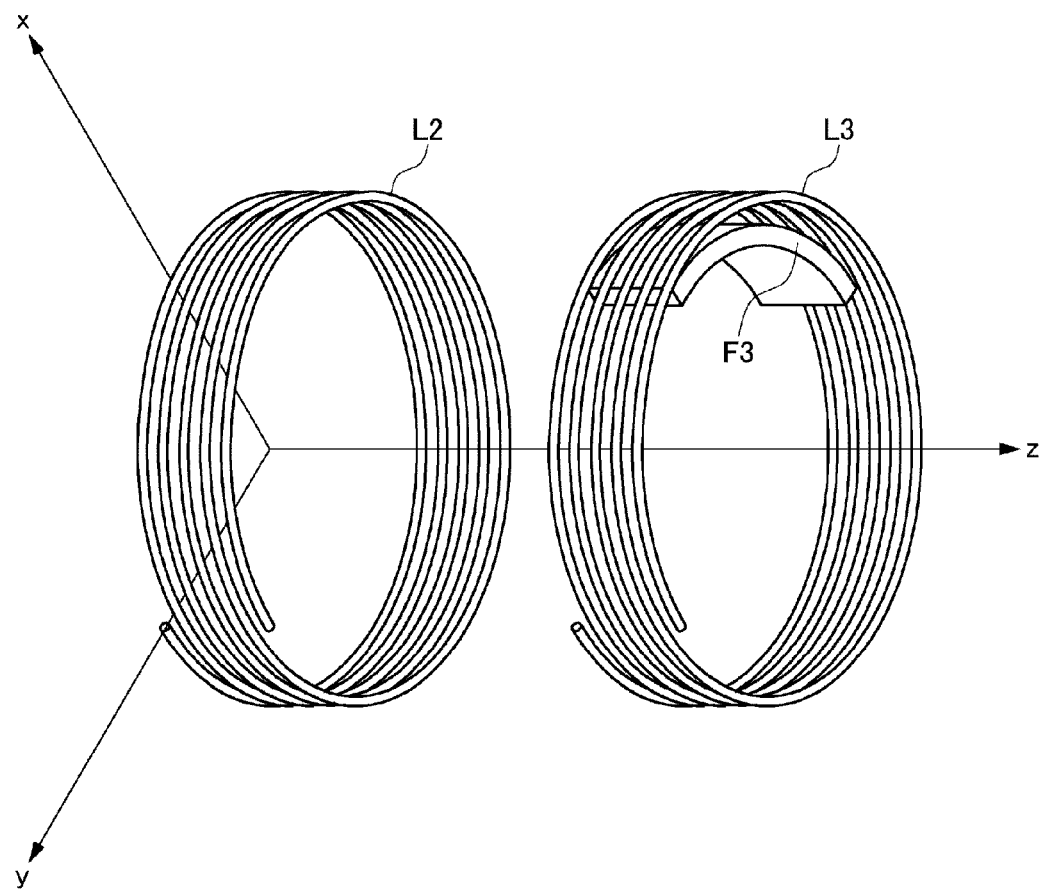
FIG. 11 is a perspective view of the feeding coil L2 and receiving coil L3 only one of which has the magnetic body.

FIG. 11 is a perspective view of the feeding coil L2 and receiving coil L3 only one of which has the magnetic body. The power feeding side magnetic body F2 is not installed inside the feeding coil L2 in FIG. 11. The power receiving side magnetic body F3 is installed inside the receiving coil L3 as in the case of FIG. 2. That is, the feeding coil L2 is the conventional type, and receiving coil L3 is the non-uniform type. Thus, the magnetic characteristics in the circumferential direction of only one of the feeding coil L2 and receiving coil L3 may be made non-uniform. Also in this case, the rotation of the non-uniform type coil allows the mutual inductance to be adjusted.

Figure 12:
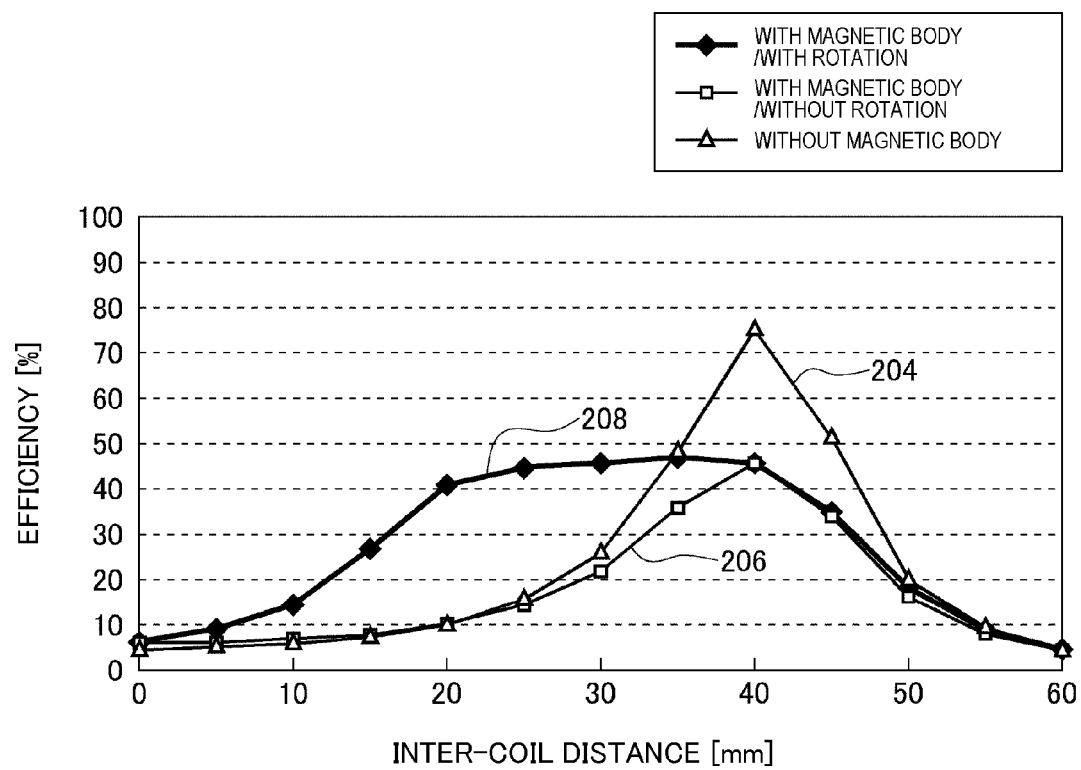
FIG. 12 is a graph illustrating the relationship between the inter-coil distance and power transmission efficiency in the case where feeding coil L2 not having the power feeding side magnetic body F2 and receiving coil L3 having the power receiving side magnetic body F3 are moved in the horizontal direction.

FIG. 12 is a graph illustrating the relationship between the inter-coil distance and power transmission efficiency in the case where feeding coil L2 not having the power feeding side magnetic body F2 and receiving coil L3 having the power receiving side magnetic body F3 are moved in the horizontal direction. The horizontal axis represents the inter-coil distance between the feeding coil L2 and receiving coil L3 which are moved in the horizontal direction (e.g., x-direction). In this example, the drive frequency fo is set such that the power transmission efficiency becomes maximum when the inter-coil distance between the conventional feeding coil L2 and conventional receiving coil L3 is 40 mm. Thus, in the without magnetic body characteristic 204, the power transmission efficiency becomes maximum when the inter-coil distance is 40 mm; when the inter-coil distance is shifted from 40 mm, the power transmission efficiency rapidly decreases.

The "with magnetic body/without rotation" characteristic 206 represents characteristics in the case where the power receiving side magnetic body F3 is installed in the receiving coil L3 but the receiving coil L3 is not rotated. Also in this case, when the inter-coil distance is shifted from 40 mm, the power transmission efficiency rapidly decreases.

The "with magnetic body/with rotation" characteristic 208 represents control characteristics in the case where the non-uniform type receiving coil L3 is rotated when the conventional type feeding coil L2 is moved in the horizontal direction so as to stabilize receiving power. In this example, the rotation angle when the inter-coil distance is 40 mm is defined to be 0°. According to the with magnetic body/with rotation characteristic 208, a power transmission efficiency of about 40% can be maintained in the range of the inter-coil distance from 20 mm to 40 mm. Thus, also in the case where the power feeding side magnetic body F2 is not installed in the feeding coil L2 while the power receiving side magnetic body F3 is installed in the receiving coil L3, the influence due to a change in the distance can be diminished or cancelled by the rotation of the receiving coil L3. However, in the case where one of the coils is the conventional type, the entire power transmission efficiency decreases as compared with a case where both the coils are the non-uniform type.

[Second Embodiment]

Figure 13:
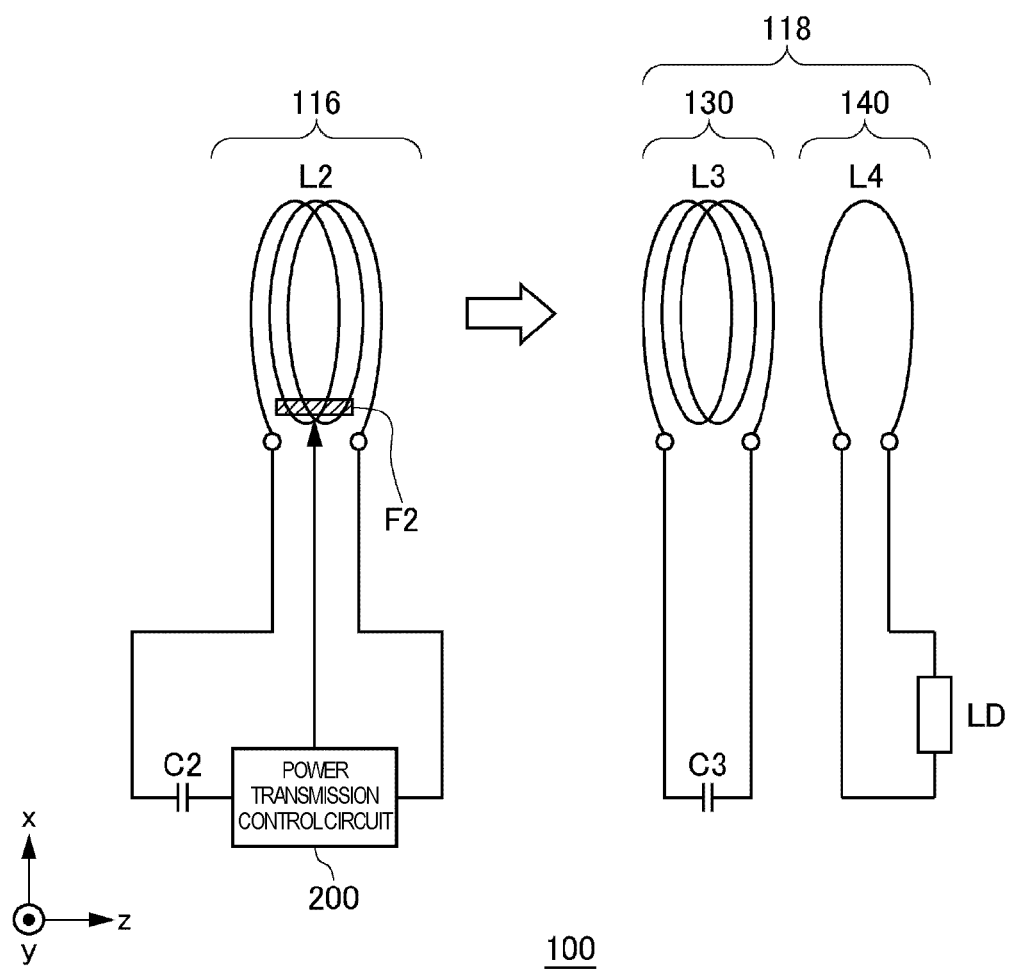
FIG. 13 is a view schematically illustrating the wireless power transmission system according to a second embodiment.

FIG. 13 is a view schematically illustrating the wireless power transmission system according to a second embodiment. In the second embodiment, not the power receiving control circuit 202 but a power transmission control circuit 200 rotates the non-uniform type feeding coil L2 so as to control feeding power. The power feeding side magnetic body F2 is installed inside the feeding coil L2. The power receiving side magnetic body F3 is not installed inside the receiving coil L3. Thus, the magnetic characteristics of the feeding coil L2 in the circumferential direction thereof are non-uniform; while the magnetic characteristics of the receiving coil L3 in the circumferential direction thereof are uniform.

The power transmission control circuit 200 functions as an AC power supply and supplies AC power of a drive frequency fo to the feeding coil L2. The power transmission control circuit 200 in the second embodiment functions not only as a power feeding source VG (FIG. 1), but also as a means for rotating the feeding coil L2. The drive frequency fo may be a fixed frequency or variable frequency.

The non-uniform type feeding coil L2 is rotatable. The power transmission control circuit 200 measures reflection power from the feeding coil L2 and rotates the feeding coil L2 according to the measurement result. Concretely, the power transmission control circuit 200 can measure the reflection power using a network analyzer or the like. The higher the power transmission efficiency, the smaller the reflection power becomes.

A target value of the reflection power is previously set in the power transmission control circuit 200. The power transmission control circuit 200 measures the reflection power while rotating the feeding coil L2. The power transmission control circuit 200 stops the rotation when the reflection power coincides with the target value. According to such a control method, feeding power or receiving power can be adjusted in the wireless power feeder 116 with a simple configuration of rotating the feeding coil L2.

The power transmission control circuit 200 may measure current and voltage phases of the feeding coil L2 and set the deviation therebetween as a control target. Since the current and voltage phases coincide with each other at the resonance state, the deviation between the current and voltage phases is 0. Thus, by measuring the deviation between the current and voltage phases, deviation from the resonance state can be detected. Concretely, the phase difference can be detected using a method disclosed in Japanese Patent Application No. 2010-147538.

Figure 14:
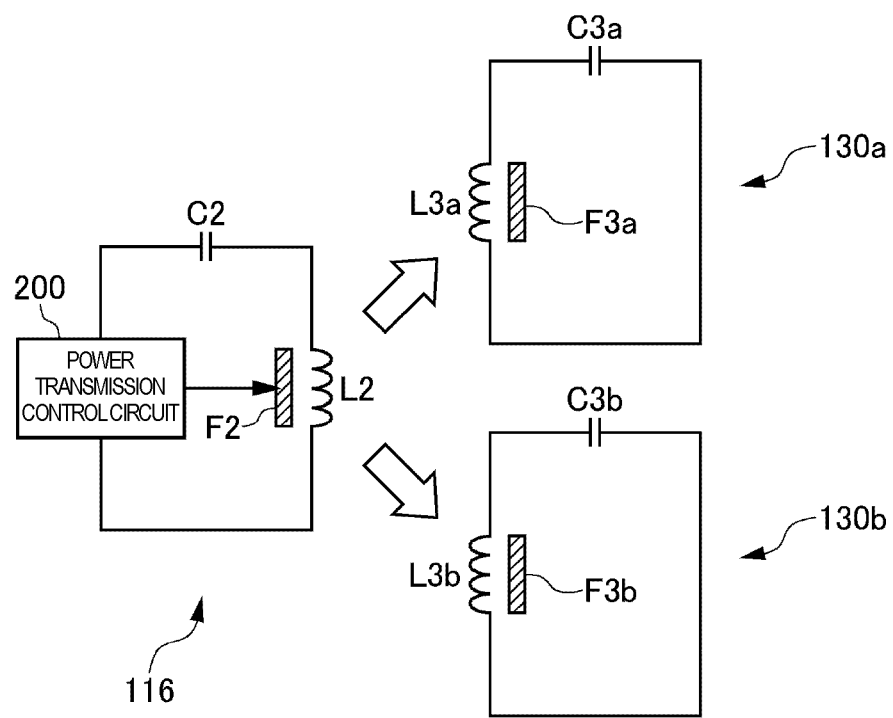
FIG. 14 is a system configuration view of the wireless power transmission system in the case where power is fed from one wireless power feeder to a plurality of wireless power receivers.

FIG. 14 is a system configuration view of the wireless power transmission system 100 in the case where power is fed from one wireless power feeder 116 to a plurality of wireless power receivers 118. As illustrated in FIG. 14, a plurality of wireless power receivers 118 may be provided for one wireless power feeder 116. In FIG. 14, only a receiving coil circuit 130a and a receiving coil circuit 130b of two wireless power receivers 118 are illustrated. The power transmission control circuit 200 can change the power distribution ratio to the two receiving coil circuits 130a and 130b by rotating the feeding coil L2. Details of this will be described below.

Figure 15:
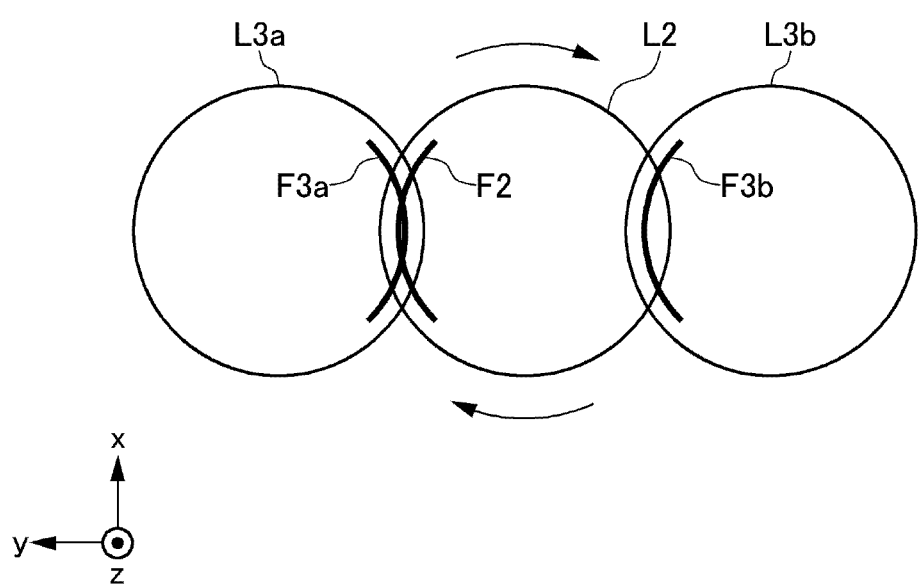
FIG. 15 is a coil arrangement view (−90°) in the case where one feeding coil L2 is made to face two receiving coils L3a and L3b.

FIG. 15 is a coil arrangement view (−90°) in the case where one feeding coil L2 is made to face two receiving coils L3a and L3b. In the following FIGS. 15 to 18, FIG. 20, and FIG. 21, the coils (feeding coil L2 and two receiving coils L3a and L3b) are viewed in the z-axis direction.

The length of the circular arc of the power feeding side magnetic body F2 is about ¼ of the inner circumference of the feeding coil L2. Similarly, the length of the circular arc of each of the power receiving side magnetic bodies F3a and F3b are about ¼ of the inner circumference of each of the receiving coils L3a and L3b. The power transmission control circuit 200 rotates the feeding coil L2 clockwise about z-axis. Since the x-axis direction is defined to be a rotation angle of 0°, the rotation angle in FIG. 15 represents −90°. When the rotation angle is −90°, the power feeding side magnetic body F2 and power receiving side magnetic body F3a face each other, while the power feeding side magnetic body F2 and power receiving side magnetic body F3b are greatly away from each other. As a result, the receiving power of the receiving coil L3a is large, while the receiving power of the receiving coil L3b is small.

Figure 16:
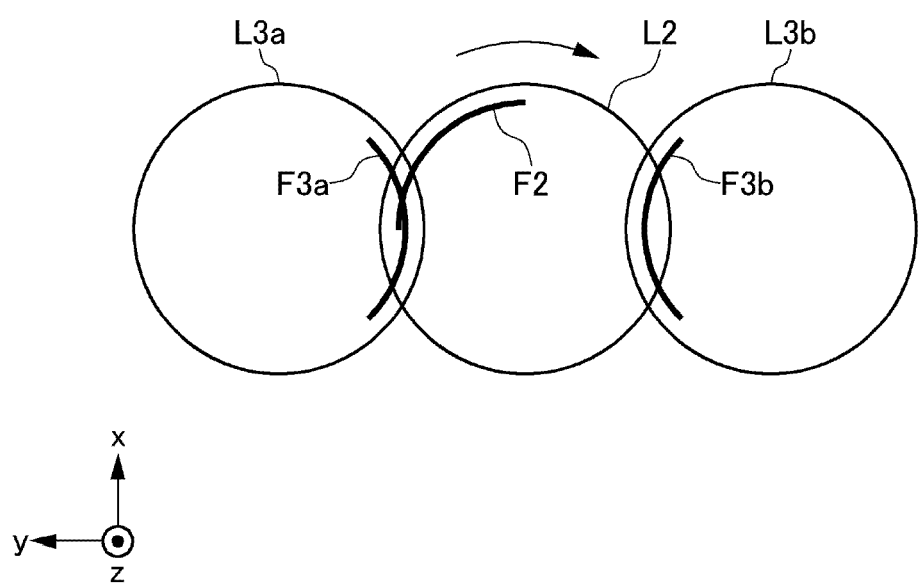
FIG. 16 is a coil arrangement view (−45°) in the case where one feeding coil L2 is made to face two receiving coils L3a and L3b.

FIG. 16 is a coil arrangement view (−45°) in the case where one feeding coil L2 is made to face two receiving coils L3a and L3b. FIG. 16 illustrates a state (rotation angle: −45°) where the feeding coil L2 is rotated clockwise by 45° from the state illustrated in FIG. 15. When the rotation angle is −45°, the power feeding side magnetic body F2 and power receiving side magnetic body F3a are slightly shifted from each other, and the receiving power of the receiving coil L3a is slightly reduced. The power receiving side magnetic body F3b and power feeding side magnetic body F2 are still away from each other, so that the receiving coil L3b receives little power.

Figure 17:
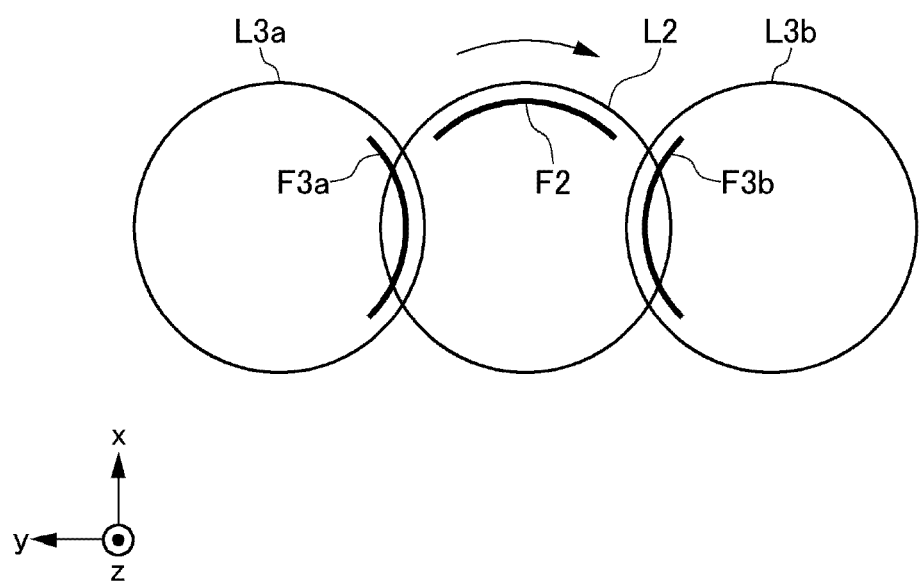
FIG. 17 is a coil arrangement view (0°) in the case where one feeding coil L2 is made to face two receiving coils L3a and L3b.

FIG. 17 is a coil arrangement view (0°) in the case where one feeding coil L2 is made to face two receiving coils L3a and L3b. FIG. 17 illustrates a state (rotation angle: 0°) where the feeding coil L2 is rotated clockwise by 45° from the state illustrated in FIG. 16. The power feeding side magnetic body F2 is away from both the power receiving side magnetic bodies F3a and F3b, so that the receiving coils L3a and L3b receive little power.

Figure 18:
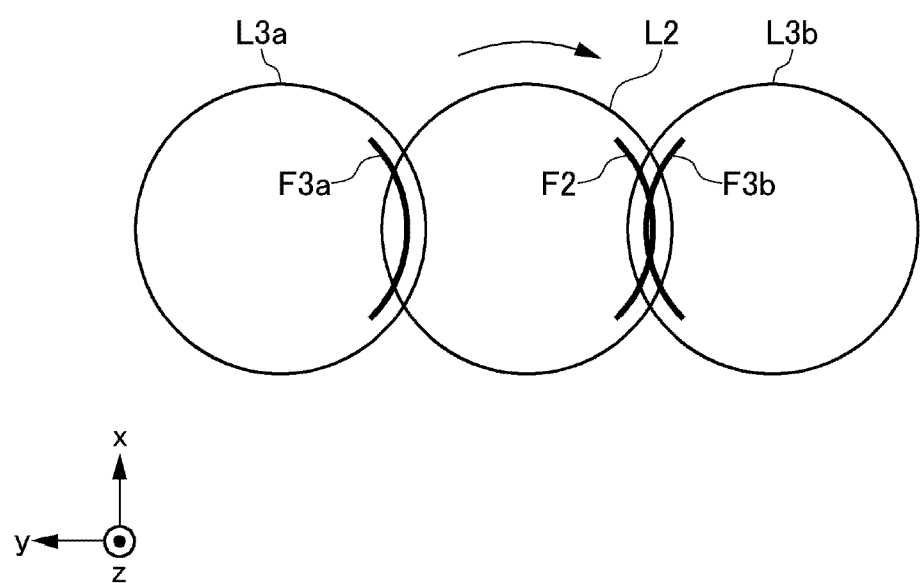
FIG. 18 is a coil arrangement view (90°) in the case where one feeding coil L2 is made to face two receiving coils L3a and L3b.

FIG. 18 is a coil arrangement view (90°) in the case where one feeding coil L2 is made to face two receiving coils L3a and L3b. FIG. 18 illustrates a state (rotation angle: 90°) where the feeding coil L2 is rotated clockwise by 90° from the state illustrated in FIG. 17. The power feeding side magnetic body F2 faces the power receiving side magnetic body F3b, so that the receiving power of the receiving coil L3b is large.

Figure 19:
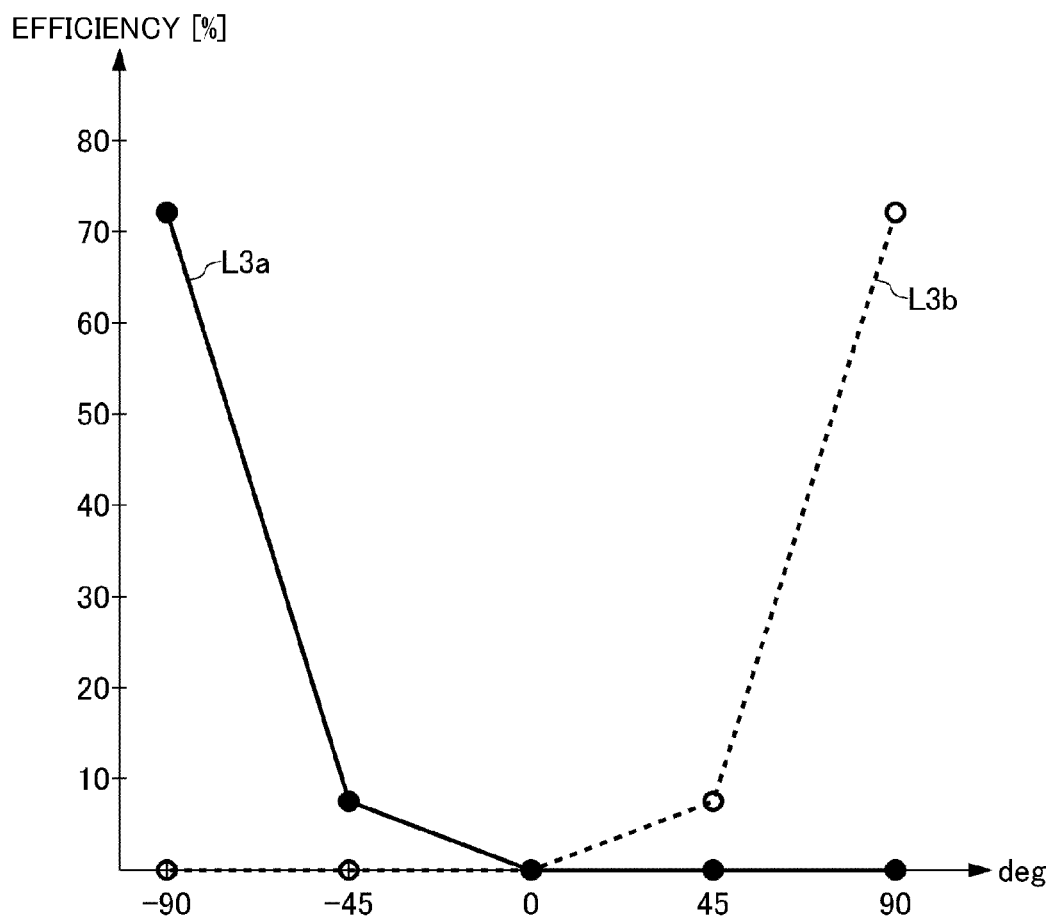
FIG. 19 is a graph illustrating the relationship between the rotation angle of the feeding coil L2 and power transmission efficiency in the case where one feeding coil L2 is made to face two receiving coils L3a and L3b.

FIG. 19 is a graph illustrating the relationship between the rotation angle of the feeding coil L2 and power transmission efficiency in the case where one feeding coil L2 is made to face two receiving coils L3a and L3b. The horizontal axis represents the rotation angle of the feeding coil L2, and vertical axis represents power transmission efficiency to the receiving coils L3a and L3b. As described using FIGS. 15 to 18, as the feeding coil L2 is rotated clockwise, the receiving power of the receiving coil L3a is reduced, while the receiving power of the receiving coil L3b is increased. That is, power can selectively be fed to the receiving coils L3a and L3b by the rotation of the feeding coil L2. According to such a control method, power feeding direction can be adjusted in the wireless power feeder 116 with a simple configuration of rotating the feeding coil L2.

Figure 20:
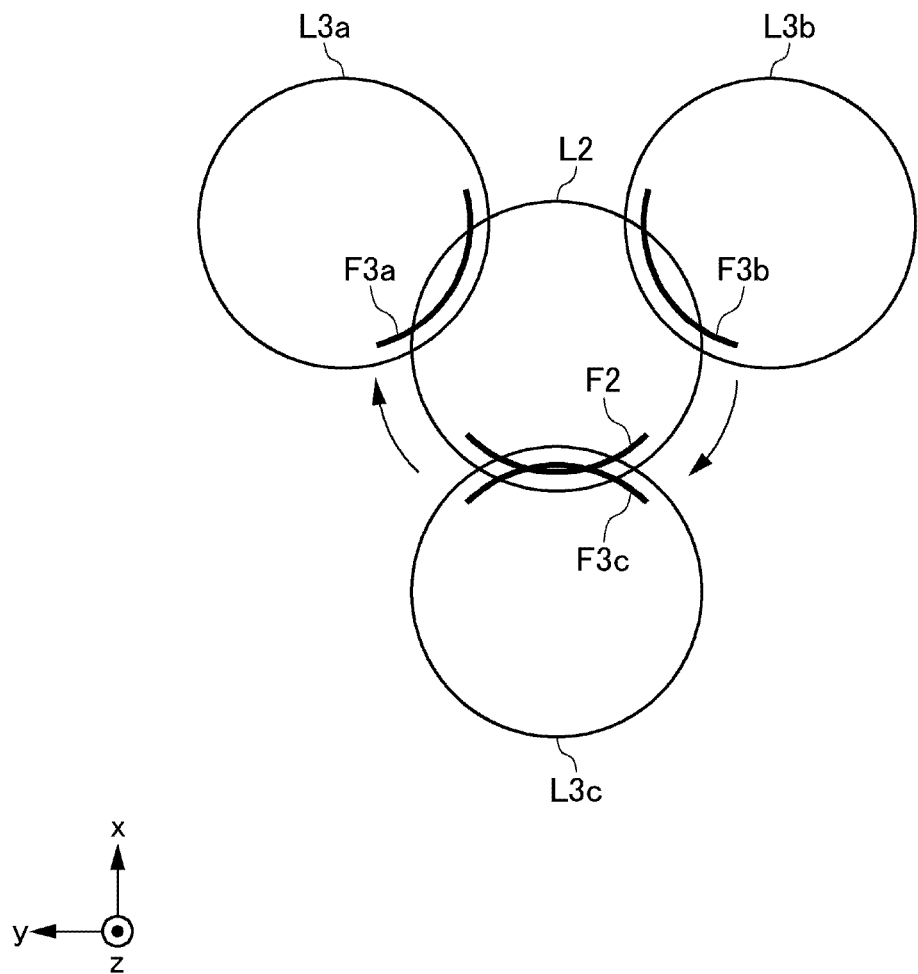
FIG. 20 is a coil arrangement view in the case where one feeding coil L2 is made to face three receiving coils L3a, L3b, and L3c.

FIG. 20 is a coil arrangement view in the case where one feeding coil L2 is made to face three receiving coils L3a, L3b, and L3c. As illustrated in FIG. 20, a configuration may be adopted in which one feeding coil L2 is made to face three receiving coils L3. In the example of FIG. 20, one coil can be selected, as a power feeding target, from the three receiving coils L3a to L3c at every 120°-rotation of the feeding coil L2.

Figure 21:
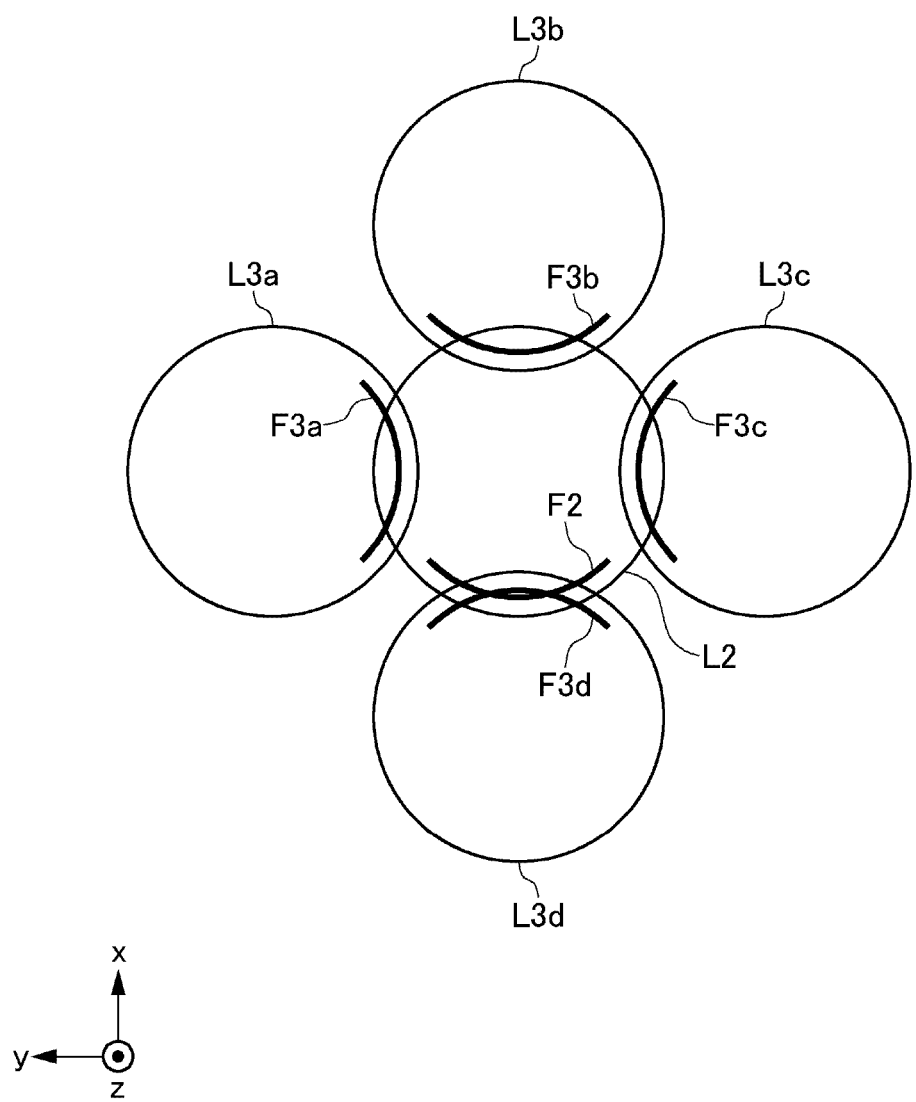
FIG. 21 is a coil arrangement view in the case where one feeding coil L2 is made to face four receiving coils L3a, L3b, L3c, and L3d.

FIG. 21 is a coil arrangement view in the case where one feeding coil L2 is made to face four receiving coils L3a, L3b, L3c, and L3d. As illustrated in FIG. 21, a configuration may be adopted in which one feeding coil L2 is made to face four receiving coils L3. In the example of FIG. 21, one coil can be selected, as a power feeding target, from the four receiving coils L3a to L3d at every 90°-rotation of the feeding coil L2. As a matter of course, a configuration may be possible in which one feeding coil L2 is made to face five or more receiving coils L3.

[Third Embodiment]

Figure 22:
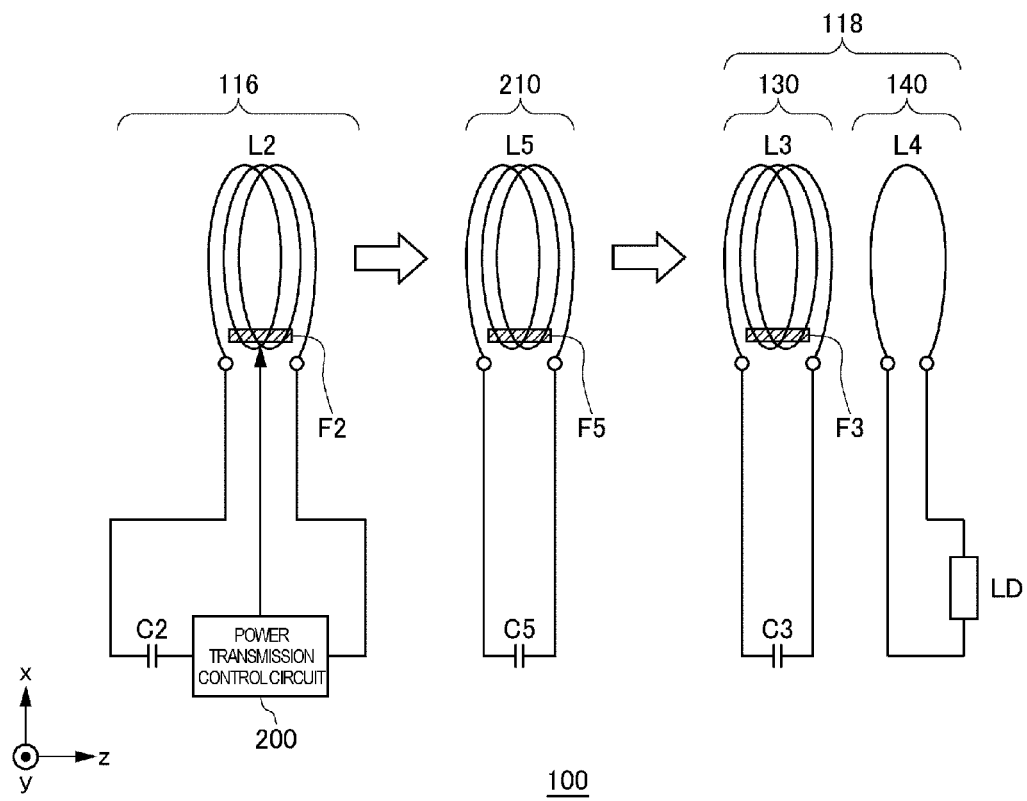
FIG. 22 is a view schematically illustrating the wireless power transmission system according to the third embodiment.

FIG. 22 is a view schematically illustrating the wireless power transmission system 100 according to the third embodiment. A power repeater 210 is added to the wireless power transmission system 100 of the third embodiment. The power receiving side magnetic body F3 is installed inside the receiving coil L3. Other configurations are the same as those of the second embodiment.

The power repeater 210 is an LC resonance circuit having the same resonance characteristics as the receiving coil L3 and includes a repeating coil L5 and a capacitor C5. A repeating side magnetic body F5 is installed in the repeating coil L5 in the same manner as the power feeding side magnetic body F2 and the power receiving side magnetic body F3. AC power fed from the wireless power feeder 116 is once received by the repeating coil L5. That is, the power repeater 210 has a function of transferring the AC power fed from the feeding coil L2 of the wireless power feeder 116 to the receiving coil L3 of the wireless power receiver 118. The repeating coil L5 then feeds the AC power to the receiving coil L3. As described above, the power repeater 210 may be interposed between the wireless power feeder 116 and the receiving coil circuit 130 so as to achieve relay transfer of the power from the feeding coil L2, repeating coil L5, and receiving coil L3 in this order. A plurality of power repeaters 210 may be interposed between the wireless power feeder 116 and receiving coil circuit 130.

Figure 23:
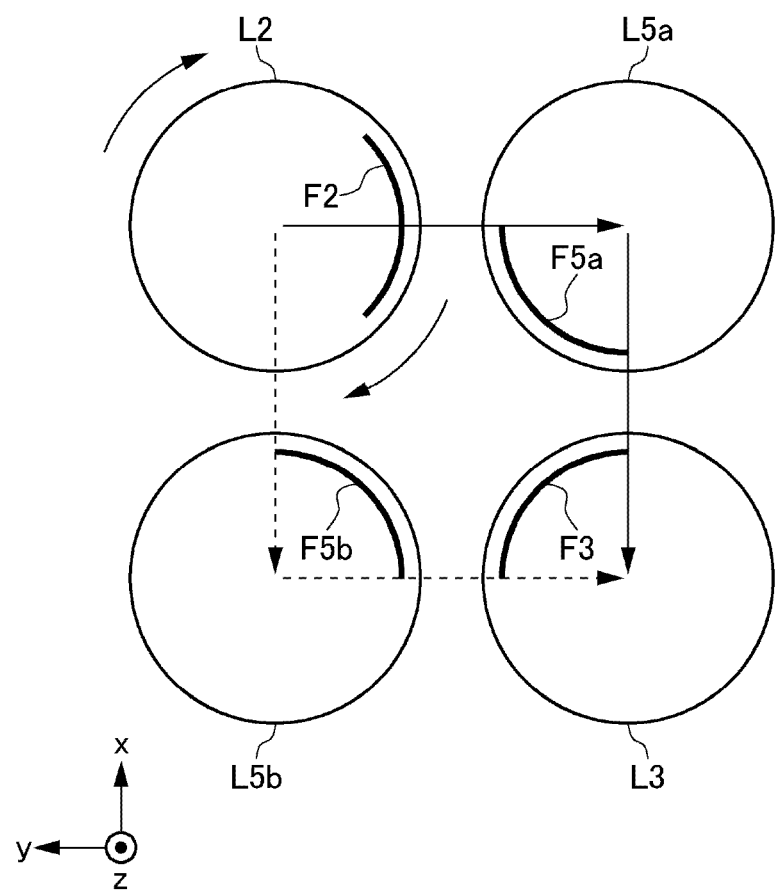
FIG. 23 is an arrangement view of the feeding coil L2, repeating coils L5a and L5b, and receiving coil L3.

FIG. 23 is an arrangement view of the feeding coil L2, repeating coils L5a and L5b, and receiving coil L3 as viewed in z-axis direction. As illustrated in FIG. 23, a set of a plurality of repeating coils L5a and L5b may be interposed between the feeding coil L2 and receiving coil L3.

The power transmission control circuit 200 rotates the feeding coil L2. In the case of FIG. 23, the power feeding side magnetic body F2 is closer to a repeating side magnetic body F5a than to the repeating side magnetic body F5b. Thus, the power from the feeding coil L2 is fed to the receiving coil L3 in a route via the repeating coil L5a, not the repeating coil L5b. As described above, in the wireless power transmission system 100 having a plurality of repeating coils L5, the power transmission route can be controlled depending on the rotation angle of the feeding coil L2. That is, a transmission route having a better power feeding environment can be selected from a plurality of power transmission routes.

Although the feeding coil L2 is rotated in the above example, the repeating coil L5 of the power repeater 210 or receiving coil L3 of the receiving coil circuit 130 may be rotated.

[Fourth Embodiment]

Figure 24:
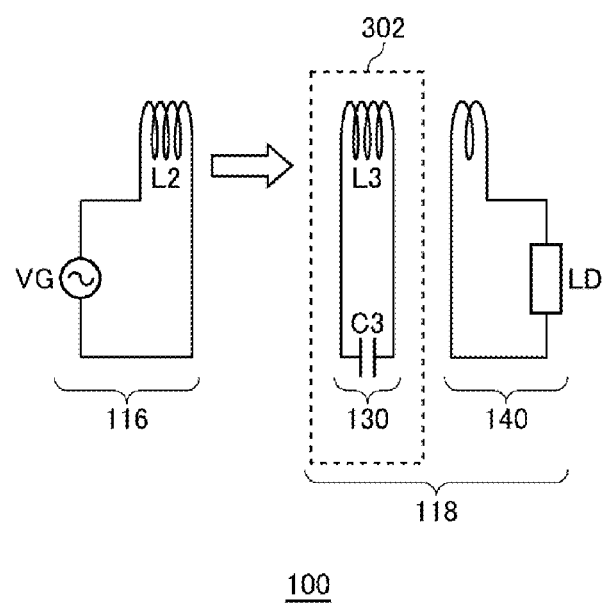
FIG. 24 is a view illustrating operation principle of the wireless power transmission system according to a fourth embodiment.

FIG. 24 is a view illustrating operation principle of the wireless power transmission system 100 according to a fourth embodiment. The wireless power transmission system 100 of the fourth embodiment also includes the wireless power feeder 116 and wireless power receiver 118. However, the wireless power receiver 118 includes the power receiving LC resonance circuit 302, while the wireless power feeder 116 does not include the power feeding LC resonance circuit 300. That is, the feeding coil L2 does not constitute a part of the LC resonance circuit. More specifically, the feeding coil L2 does not form any resonance circuit with other circuit elements included in the wireless power feeder 116. No capacitor is connected in series or in parallel to the feeding coil L2. Thus, the feeding coil L2 does not resonate in a frequency at which power transmission is performed.

The power feeding source VG supplies AC current of the resonance frequency fr1 to the feeding coil L2. The feeding coil L2 does not resonate but generates an AC magnetic field of the resonance frequency fr1. The power receiving LC resonance circuit 302 resonates by receiving the AC magnetic field. As a result, high AC current flows in the power receiving LC resonance circuit 302. Studies have revealed that formation of the LC resonance circuit is not essential in the wireless power feeder 116. The feeding coil L2 does not constitute apart of the power feeding LC resonance circuit, so that the wireless power feeder 116 does not resonate at the resonance frequency fr1. It has been generally understood that, in the wireless power feeding of a magnetic field resonance type, making resonance circuits which are formed on the power feeding side and power receiving side resonate at the same resonance frequency fr1 (=fr0) allows power feeding of high power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the feeding coil L2 and receiving coil L3 are magnetic-field coupled to each other, a new resonance circuit (new resonance circuit formed by coupling of resonance circuits) is not formed due to absence of the capacitor C2. In this case, the stronger the magnetic field coupling between the feeding coil L2 and receiving coil L3, the greater the influence exerted on the resonance frequency of the power receiving LC resonance circuit 302. By supplying AC current of this resonance frequency, i.e., resonance frequency near fr1 to the feeding coil L2, the wireless power feeding of a magnetic field resonance type can be achieved. In this configuration, the capacitor C2 need not be provided, which is advantageous in terms of size and cost.

Figure 25:
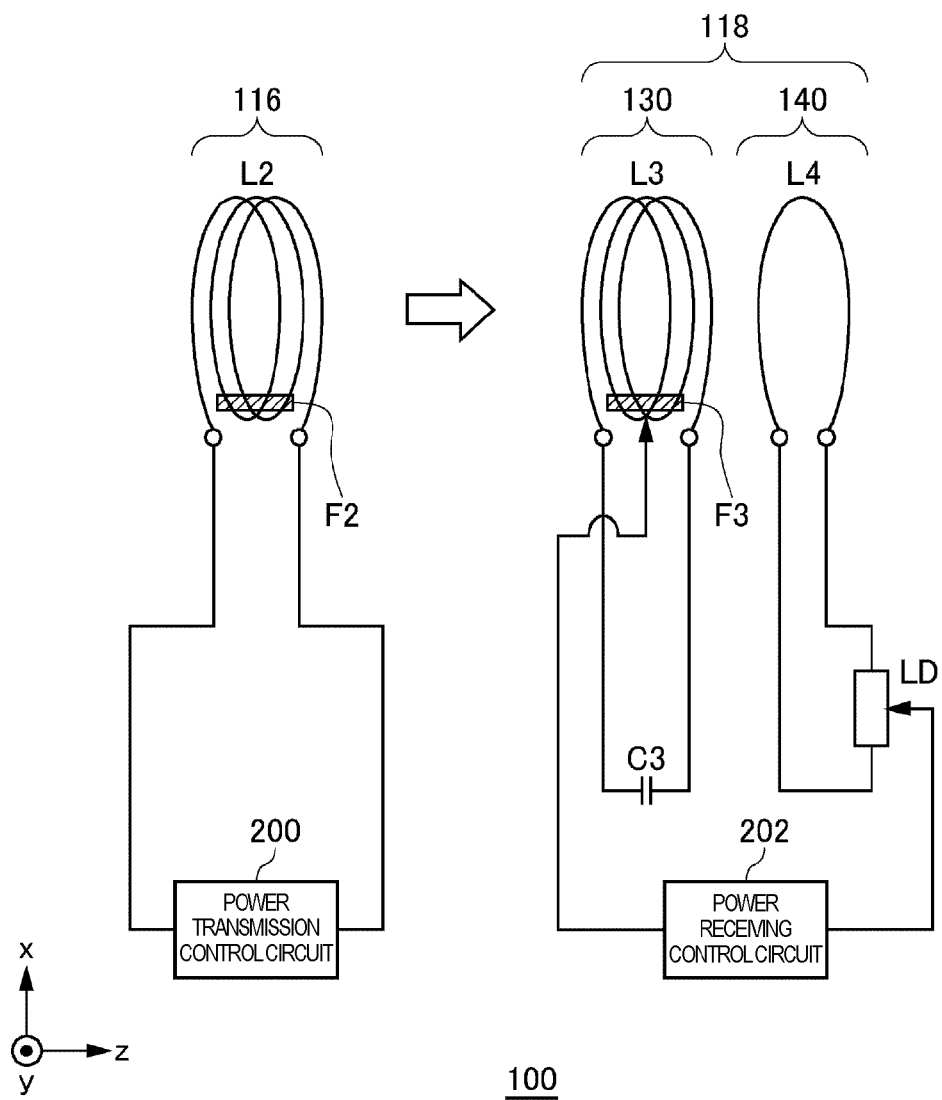
FIG. 25 is an example of a system configuration view of the wireless power transmission system according to the fourth embodiment.

FIG. 25 is an example of a system configuration view of the wireless power transmission system 100 according to the fourth embodiment. In the wireless power transmission system 100 of the fourth embodiment illustrated in FIG. 25, the capacitor C2 is omitted. Other configurations are the same as those of the wireless power transmission system 100 of the first embodiment illustrated in FIG. 3.

Figure 26:
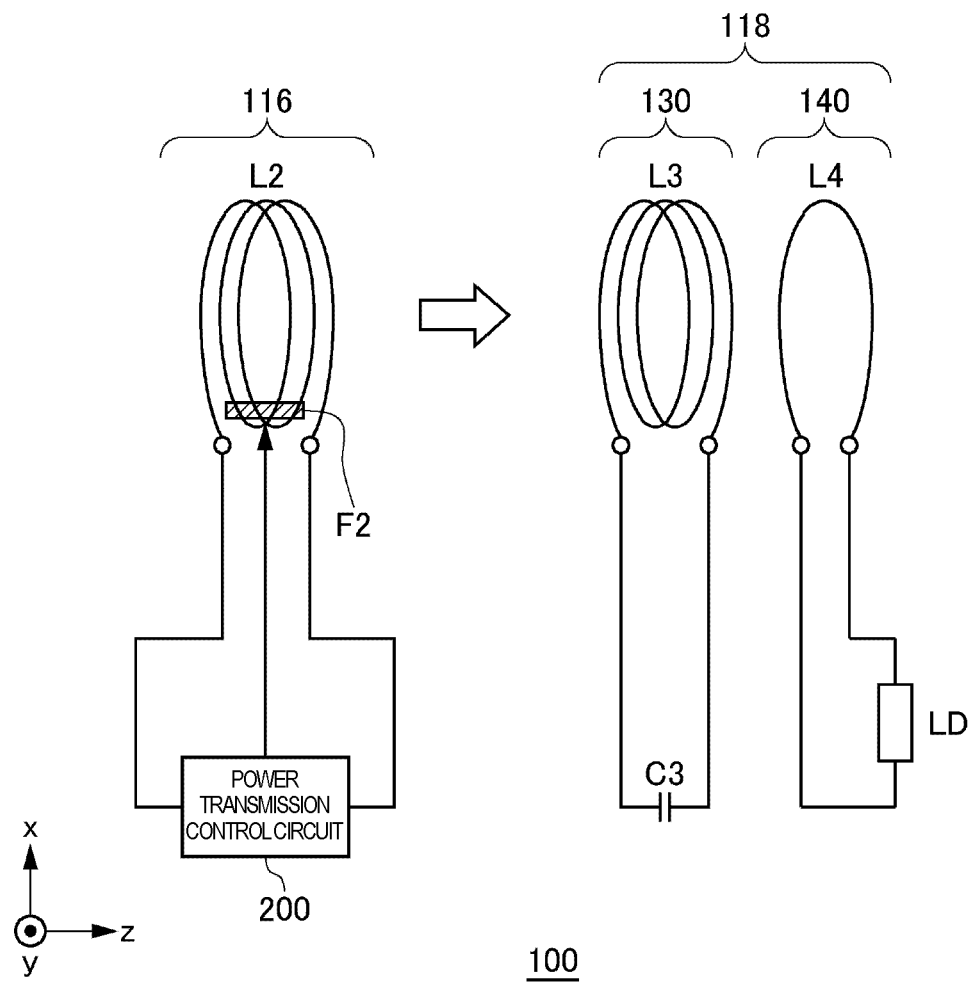
FIG. 26 is another example of a system configuration view of the wireless power transmission system according to the fourth embodiment.

FIG. 26 is another example of a system configuration view of the wireless power transmission system 100 according to the fourth embodiment. In the wireless power transmission system 100 of the fourth embodiment illustrated in FIG. 26, the capacitor C2 is omitted. Other configurations are the same as those of the wireless power transmission system 100 of the second embodiment illustrated in FIG. 13. Also in the wireless power transmission system 100 of the third embodiment illustrated in FIG. 22, the capacitor C2 can be omitted.

Hereinafter, various configurations for making the magnetic characteristics in the coil (feeding coil L2, receiving coil L3, and repeating coil L5) circumferential direction non-uniform will be described. FIGS. 27 to 40 are coil arrangement views as viewed in z-axis direction.

Figure 27:
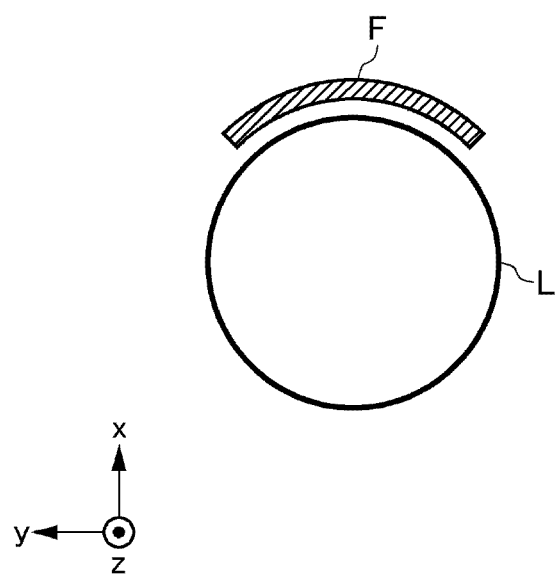
FIG. 27 is a view illustrating a coil in a first configuration example.

FIG. 27 is a view illustrating a coil L in a first configuration example. As illustrated in FIG. 27, in the first configuration example, a circular arc magnetic body F is installed not on the inner side surface but on the outer side surface.

Figure 28:
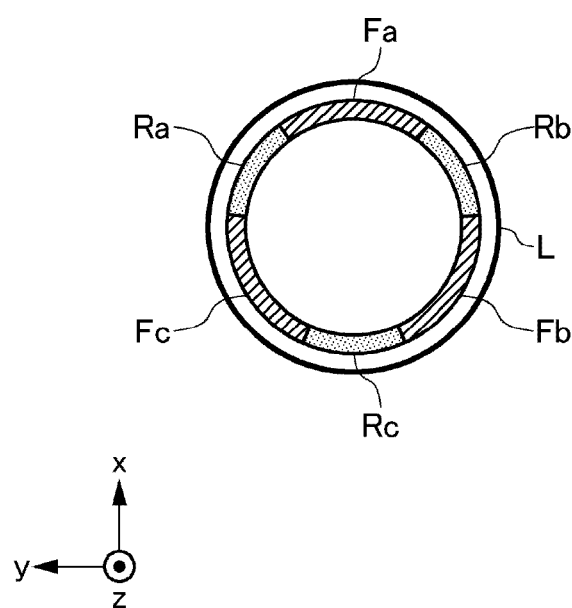
FIG. 28 is a view illustrating a coil in a second configuration example.

FIG. 28 is a view illustrating a coil L in a second configuration example. In the second configuration example, a ring where three magnetic bodies Fa to Fc and three resins Ra to Rc are alternately connected to one another is installed on the inner side surface of the coil L. The magnetic field is strong near the magnetic bodies Fa to Fc but weak near the resins Ra to Rc, thus making the magnetic characteristics in the circumferential direction of the coil L non-uniform.

Figure 29:
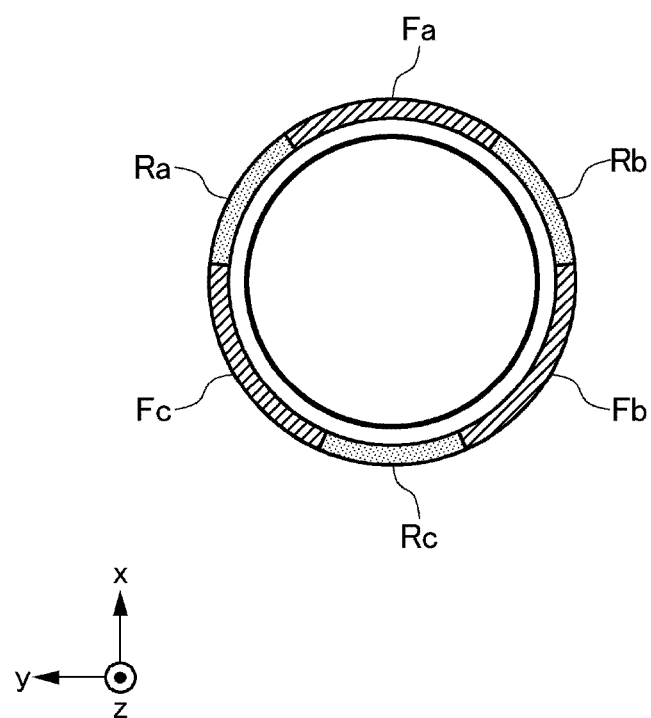
FIG. 29 is a view illustrating a coil in a third configuration example.

FIG. 29 is a view illustrating a coil L in a third configuration example. In the third configuration example, the ring constituted by magnetic bodies F and resins R of the second configuration example is installed not on the inner side surface of the coil L, but on the outer side surface thereof.

Figure 30:
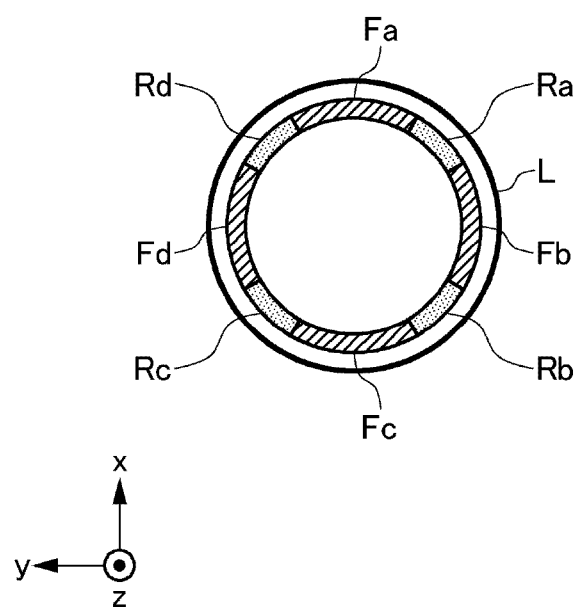
FIG. 30 is a view illustrating a coil in a fourth configuration example.

FIG. 30 is a view illustrating a coil L in a fourth configuration example. In the fourth configuration example, a ring where four magnetic bodies Fa to Fd and four resins Ra to Rd alternately connected to one another is installed on the inner side surface of the coil L.

Figure 31:
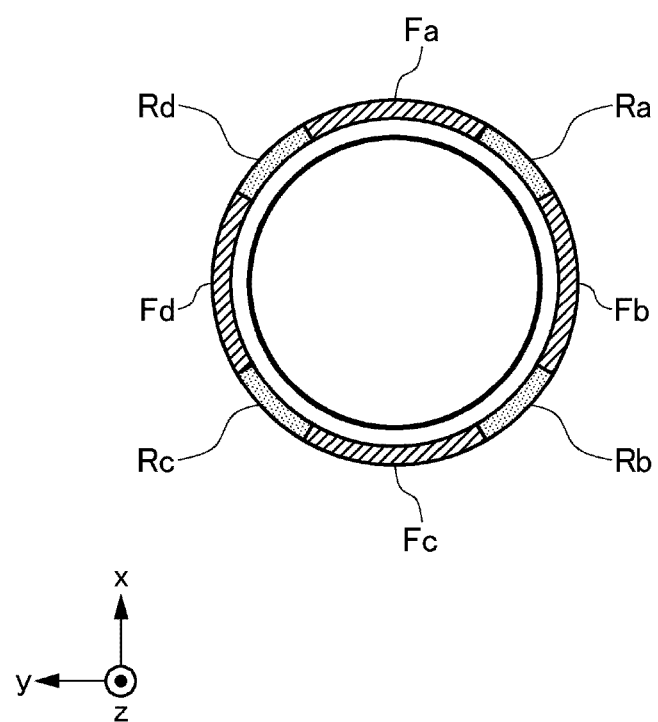
FIG. 31 is a view illustrating a coil in a fifth configuration example.

FIG. 31 is a view illustrating a coil L in a fifth configuration example. In the fifth configuration example, the ring constituted by magnetic bodies F and resins R of the fourth configuration example is installed not on the inner side surface of the coil L but on the outer side surface thereof.

Figure 32:
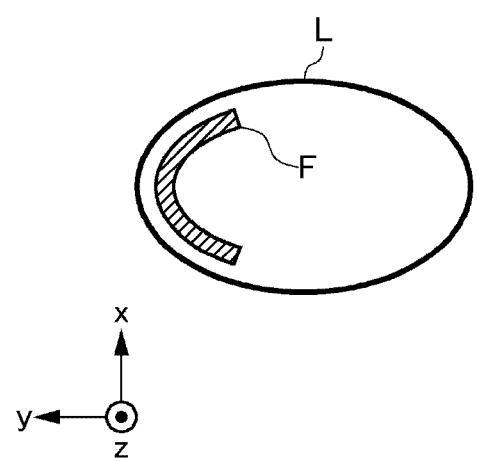
FIG. 32 is a view illustrating a coil in a sixth configuration example.

FIG. 32 is a view illustrating a coil L in a sixth configuration example. In the sixth configuration example, the coil L is shaped as an ellipse, and a circular arc magnetic body F is installed at a part of the inner side surface of the coil L. Since the feeding coil L2 is shaped as an ellipse, the magnetic field on the major axis side is stronger than the magnetic field on the minor axis side. The installation of the magnetic body F increases further the non-uniformity of magnetic field characteristics.

Figure 33:
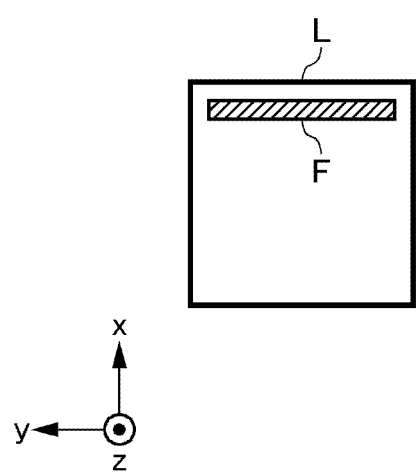
FIG. 33 is a view illustrating a coil in a seventh configuration example.

FIG. 33 is a view illustrating a coil L in a seventh configuration example. In the seventh configuration example, the coil L is shaped as a square, and a plate-like magnetic body F is installed on the inner side surface of one side of the coil L.

Figure 34:
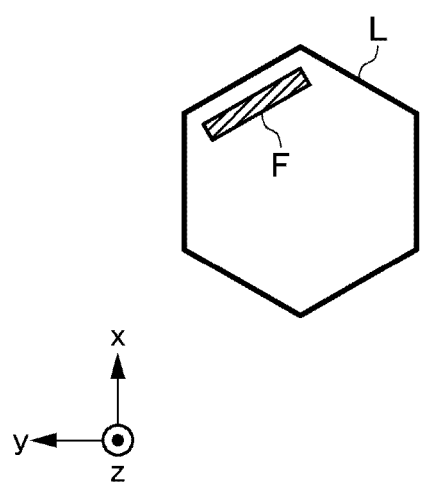
FIG. 34 is a view illustrating a coil in an eighth configuration example.

FIG. 34 is a view illustrating a coil L in an eighth configuration example. In the eighth configuration example, the coil L is shaped as a hexagon, and a plate-like magnetic body F is installed on the inner side surface of one side of the coil L.

Figure 35:
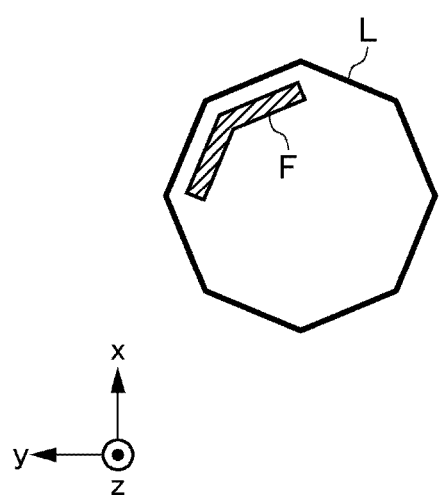
FIG. 35 is a view illustrating a coil in a ninth configuration example.

FIG. 35 is a view illustrating a coil L in a ninth configuration example. In the ninth configuration example, the coil L is shaped as an octagon, and a plate-like magnetic body F is installed on the inner side surface of the coil L over the two sides thereof. By forming the feeding coil L2 into a shape other than a true circle, such as an ellipse, a square, or a rectangle, as described above, the magnetic field characteristics can be made non-uniform. The magnetic body F may be installed not only on the inner side surface of the coil L but also on the outer side surface. In the case where a feeding coil L2 (or receiving coil L3) having a shape other than a true circle, such as an ellipse, is used, even the magnetic body F is not essential. This is because that the magnetic characteristics in the rotation direction of a coil having a shape other than a true circle are non-uniform, so that it is possible to aggressively change the magnetic characteristics only by rotating the coil.

Figure 36:
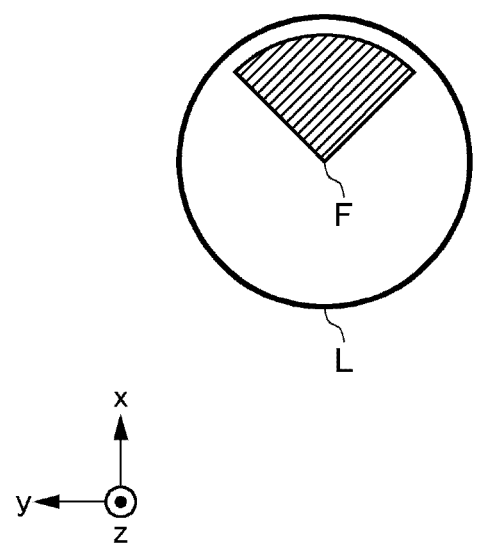
FIG. 36 is a view illustrating a coil in a tenth configuration example.

FIG. 36 is a view illustrating a coil L in a tenth configuration example. In the tenth configuration example, not the circular arc but a fan-shaped magnetic body F is installed on the inner side surface of the coil L.

Figure 37:
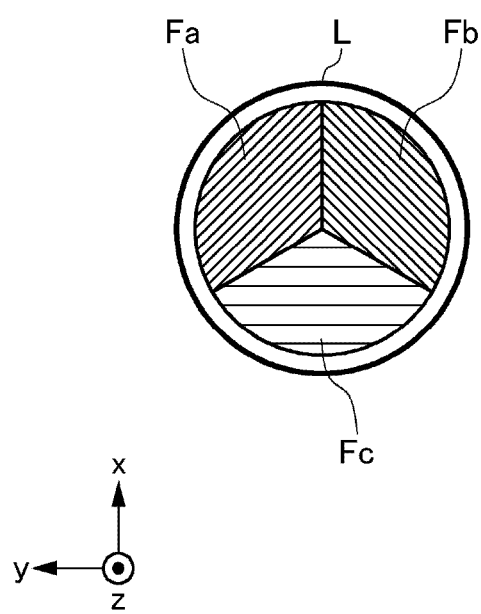
FIG. 37 is a view illustrating a coil in an eleventh configuration example.

FIG. 37 is a view illustrating a coil L in an eleventh configuration example. In the eleventh configuration example, three fan-shaped magnetic bodies Fa to Fc are installed inside the coil L. The magnetic bodies Fa to Fc have different magnetic permeabilities from one another. Also in such a configuration, the magnetic characteristics in the circumferential direction of the coil L are made non-uniform.

Figure 38:
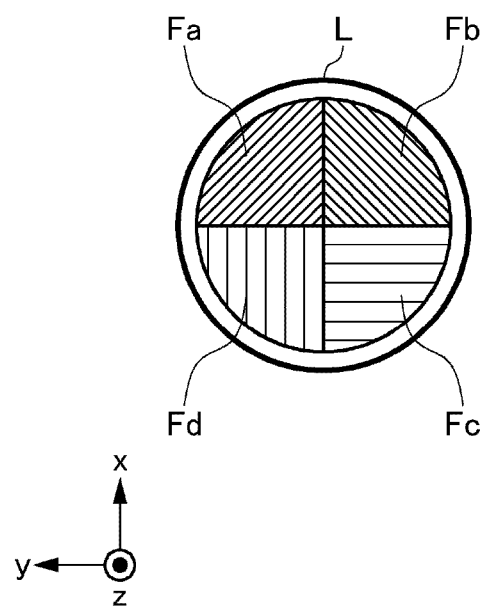
FIG. 38 is a view illustrating a coil in a twelfth configuration example.

FIG. 38 is a view illustrating a coil L in a twelfth configuration example. In the twelfth configuration example, four fan-shaped magnetic bodies Fa to Fd are installed inside the coil L. The magnetic bodies Fa to Fd have different magnetic permeabilities from one another.

Figure 39:
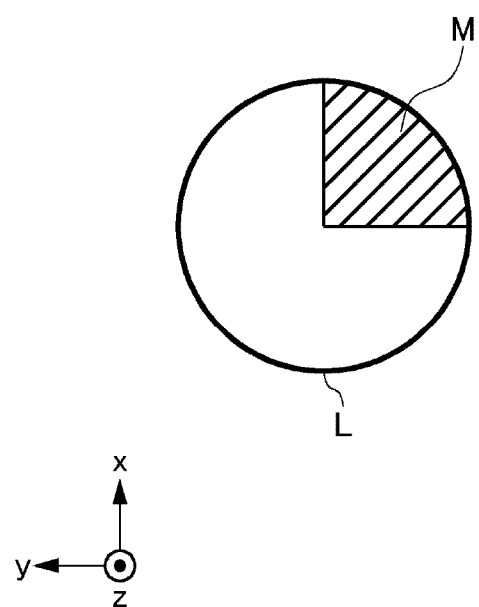
FIG. 39 is a view illustrating a coil in a thirteenth configuration example.

FIG. 39 is a view illustrating a coil L in a thirteenth configuration example. In the thirteenth configuration example, a fan-shaped metal plate M is installed inside the coil L. By installing a magnetic material such as ferrite, a substantially non-magnetic material such as resin, or the like in a part of the coil L, the magnetic characteristics of the coil L can be made non-uniform.

Figure 40:
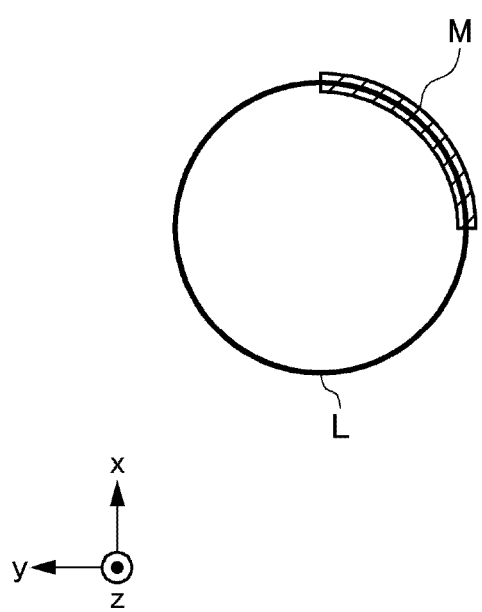
FIG. 40 is a view illustrating a coil in a fourteenth configuration example.

FIG. 40 is a view illustrating a coil L in a fourteenth configuration example. In the fourteenth configuration example, a part of the circumference of the coil L is covered by a metal plate M.

The various embodiments of the wireless power transmission system 100 according to the present invention have thus been described. According to the wireless power transmission system 100, by controlling the rotation angle of the feeding coil L2, receiving coil L3, repeating coil L5, or the like, it is possible to control the power transmission efficiency or power transmission direction. Since a complicated electrical circuit as disclosed in related arts need not be provided, power control in the wireless power feeding can be achieved with a simple configuration. This is because the coil having a configuration in which the magnetic characteristics in the circumferential direction are made non-uniform is used to allow the coil rotation and strength of the magnetic field to correlate with each other.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power feeding method of the present invention may be used.

The coil, such as the feeding coil L2 need not always be rotated about z-axis but may be rotated about any axis such as x-axis or y-axis.

What is claimed is:

1. A wireless power feeder that wirelessly feeds power from a feeding coil to a receiving coil using a magnetic field resonance phenomenon between the feeding coil and receiving coil, said feeder comprising:
    the feeding coil constructed in a rotatable manner; and
    a power transmission control circuit that supplies AC power to the feeding coil so as to make the feeding coil feed the AC power to the receiving coil,
    the feeding coil being constructed such that magnetic characteristics thereof in a circumferential direction are made non-uniform.

2. The wireless power feeder according to claim 1, wherein a magnetic body is installed at only a part of a circumference of the feeding coil to make the magnetic characteristics of the feeding coil in the circumferential direction non-uniform.

3. The wireless power feeder according to claim 1, wherein the power transmission control circuit rotates the feeding coil so as to control the AC power to be fed from the feeding coil to the receiving coil.

4. A wireless power receiver that wirelessly receives, at a receiving coil, AC power fed from a feeding coil using a magnetic field resonance phenomenon between the feeding coil and receiving coil, said receiver comprising:
    the receiving coil constructed in a rotatable manner; and
    a loading circuit including a loading coil that is magnetically coupled to the receiving coil to receive the AC power from the receiving coil and a load that receives the AC power from the loading coil,
    the receiving coil being constructed such that magnetic characteristics thereof in a circumferential direction thereof are made non-uniform.

5. The wireless power receiver according to claim 4, wherein a magnetic body is installed at only a part of a circumference of the receiving coil to make the magnetic characteristics of the receiving coil in the circumferential direction non-uniform.

6. The wireless power receiver according to claim 4, further comprising a power receiving control circuit that rotates the receiving coil so as to control the AC power received by the receiving coil.

7. A wireless power transmission system for wirelessly feeding power from a feeding coil to a receiving coil using a magnetic field resonance phenomenon between the feeding coil and receiving coil, said system comprising:
    a wireless power feeder and a wireless power receiver,
    the wireless power feeder including:
        the feeding coil; and
        a power transmission control circuit that supplies AC power to the feeding coil so as to make the feeding coil feed the AC power to the receiving coil,
    the wireless power receiver including:
        the receiving coil; and
        a loading circuit including a loading coil that is magnetically coupled to the receiving coil to receive the AC power from the receiving coil and a load that receives the AC power from the loading coil, and
    at least one of the feeding and receiving coils being constructed in a rotatable manner and constructed as a non-uniform type coil in which magnetic characteristics thereof in a circumferential direction are non-uniform.

8. The wireless power transmission system according to claim 7, wherein
    at least the receiving coil is constructed as the non-uniform type coil, and
    the wireless power receiver further includes a power receiving control circuit that rotates the receiving coil so as to control the AC power received by the receiving coil.

9. The wireless power transmission system according to claim 7, wherein
    at least the feeding coil is constructed as the non-uniform type coil, and
    the power transmission control circuit rotates the feeding coil so as to control the AC power to be fed from the feeding coil to the receiving coil.

10. The wireless power transmission system according to claim 7, wherein
    a plurality of wireless power receivers are provided for one wireless power feeder, and
    AC power supplied from one feeding coil is received by one or more receiving coils.

* * * * *